(12) United States Patent  
Kinoshita et al.

(10) Patent No.: US 12,238,407 B2  
(45) Date of Patent: Feb. 25, 2025

(54) INFORMATION PROCESSING APPARATUS, CONTROL METHOD, AND STORAGE MEDIUM

(71) Applicant: CANON KABUSHIKI KAISHA, Tokyo (JP)

(72) Inventors: Yuichi Kinoshita, Kanagawa (JP); Masahiko Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 263 days.

(21) Appl. No.: 17/826,841

(22) Filed: May 27, 2022

(65) Prior Publication Data

US 2022/0385829 A1 Dec. 1, 2022

(30) Foreign Application Priority Data

May 31, 2021 (JP) ................. 2021-091346

(51) Int. Cl.
*H04N 23/63* (2023.01)
*H04N 5/262* (2006.01)
*H04N 13/207* (2018.01)
*H04N 23/698* (2023.01)

(52) U.S. Cl.
CPC ......... *H04N 23/632* (2023.01); *H04N 5/2628* (2013.01); *H04N 13/207* (2018.05); *H04N 23/635* (2023.01); *H04N 23/698* (2023.01)

(58) Field of Classification Search
CPC .. H04N 23/632; H04N 23/663; H04N 23/635; H04N 23/698; H04N 23/55; H04N 5/2628; H04N 13/207
See application file for complete search history.

(56) References Cited

U.S. PATENT DOCUMENTS

| 2012/0236128 A1* | 9/2012 | Ueda ................. H04N 13/246 348/E13.074 |
| 2017/0025038 A1* | 1/2017 | Oguchi .......... H04N 21/440263 |
| 2019/0313075 A1* | 10/2019 | Moss .................... H04N 13/194 |

FOREIGN PATENT DOCUMENTS

| JP | 2005045328 | * | 2/2005 |
| JP | 2013141052 A | | 7/2013 |

\* cited by examiner

*Primary Examiner* — Kathleen V Nguyen
(74) *Attorney, Agent, or Firm* — CANON U.S.A., INC. IP DIVISION

(57) ABSTRACT

An information processing apparatus includes a communication unit configured to communicate with a camera configured to capture a third image which is one image in which left and right images are arranged, and a control unit configured to display the third image on a display unit and set a position of an enlarged range to which enlargement processing is to be applied by the camera in the third image displayed on the display unit, and the control unit converts the set position of the enlarged range based on a display format in which the third image is displayed on the display unit, and outputs an instruction to the camera.

20 Claims, 16 Drawing Sheets

EXTERNAL STORAGE DEVICE

FIG.7A

| LENS DESIGN VALUE |
| --- |
| LENS INDIVIDUAL VALUE |
| LENS FLAG |
| LENS FOCAL LENGTH |
| LENS TEMPERATURE |

FIG.7B

| | |
| --- | --- |
| LENS DESIGN VALUE | IMAGE CIRCLE POSITION |
| | IMAGE CIRCLE DIAMETER |
| | FIELD ANGLE |
| | DISTORTION CORRECTION COEFFICIENT |
| LENS INDIVIDUAL VALUE | IMAGE CIRCLE POSITIONAL SHIFT |
| | OPTICAL AXIS TILT |
| | IMAGE MAGNIFICATION DEVIATION |

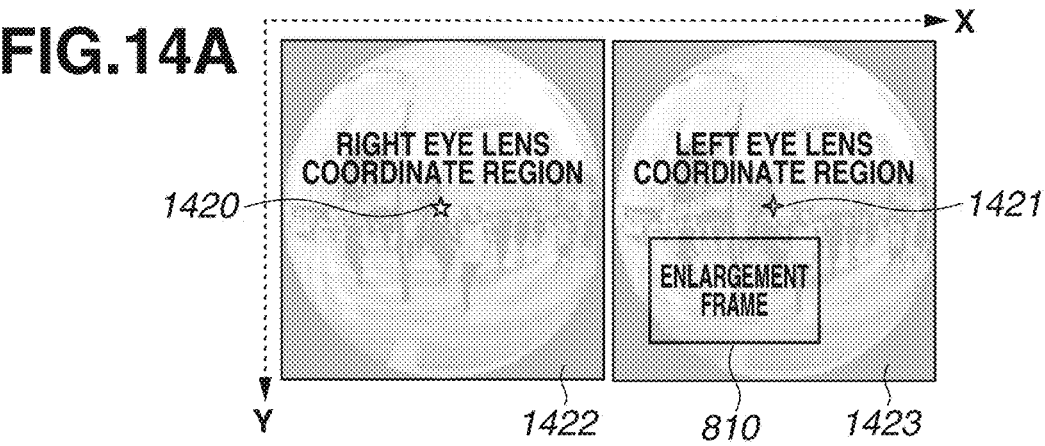
FIG.14A DUAL-LENS IMAGE (CAMERA) COORDINATE SYSTEM
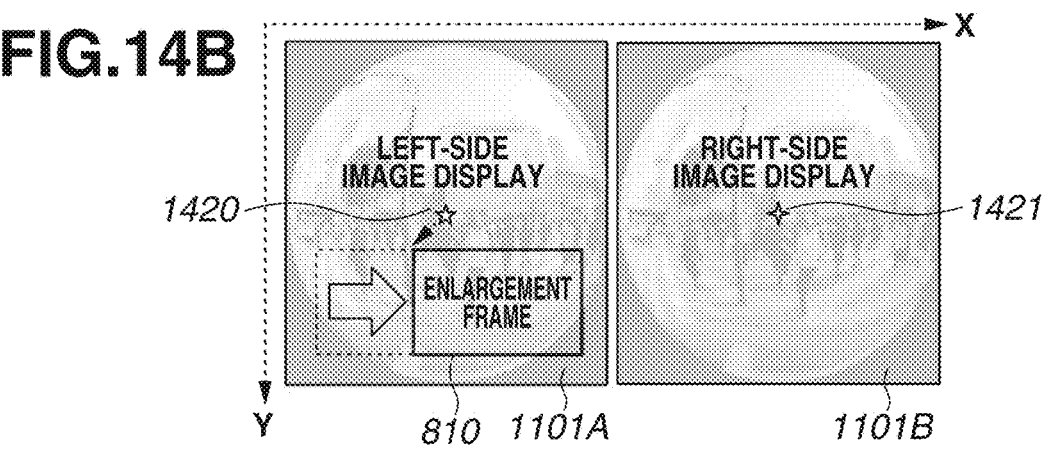
FIG.14B ENLARGEMENT FRAME MOVEMENT IN LEFT-RIGHT SWAPPED DISPLAY
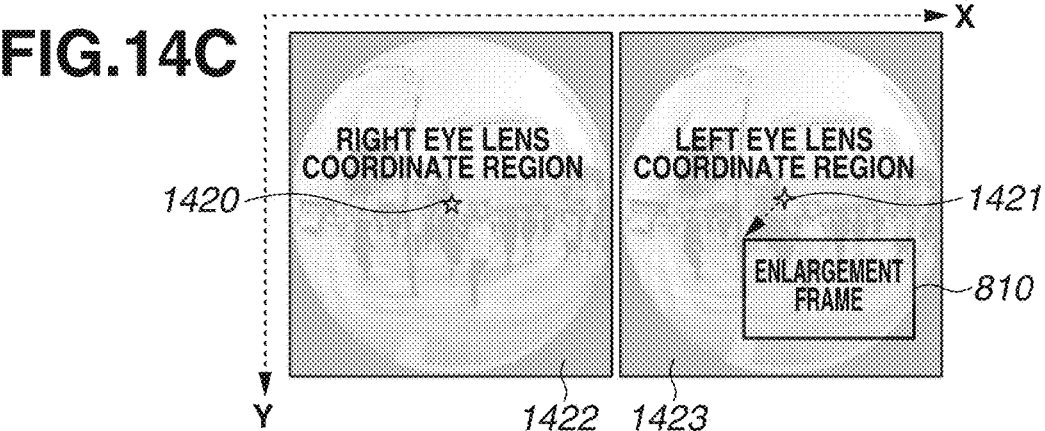
FIG.14C ISSUE ENLARGEMENT FRAME MOVEMENT INSTRUCTION AFTER CONVERSION INTO DUAL-LENS IMAGE (CAMERA) COORDINATE SYSTEM

INFORMATION PROCESSING APPARATUS, CONTROL METHOD, AND STORAGE MEDIUM

BACKGROUND

Technical Field

The aspect of the embodiments relates to an information processing apparatus, a control method, and a storage medium.

Description of the Related Art

There has been known a technique of capturing two images with parallax using two cameras, and displaying the captured two images in a stereoscopically-viewable manner Japanese Patent Application Laid-Open No. 2013-141052 discusses a camera that is attached with a lens unit including two optical systems and can capture two images with parallax at one time.

In some cases, a live view image captured by a digital camera is transmitted to an external terminal of the digital camera, and the live view image is displayed on a display unit of the external terminal. The external terminal can also control operations of the digital camera by transmitting a recording start instruction or a control command for image processing to the digital camera. As the external terminal, a personal computer, a smartphone, or a tablet that can display an image on a display is used. A user can check a live view image and control the digital camera using the external terminal from a position distant from the digital camera.

If an image (one image including two images with parallax) captured by a digital camera attached with a lens unit including two optical systems is displayed in the same way as a conventional image, a positional relationship between the two optical systems and a positional relationship between the two images in the one image reverse in some cases. Thus, in the case of controlling the digital camera while displaying a live view image acquired from the digital camera on the external terminal, image processing different from that executed on an image captured by a digital camera attached with a conventional single lens is required. Nevertheless, in the prior art such as the technique discussed in Japanese Patent Application Laid-Open No. 2013-141052, such an issue has not been considered enough.

SUMMARY

According to an aspect of the embodiments, a processing apparatus includes a communication unit configured to communicate with an imaging apparatus configured to capture one third image including a first image corresponding to a first image input via a first optical system, and a second image corresponding to a second image input via a second optical system having predetermined parallax with respect to the first optical system, a control unit configured to display the third image on a display unit, and a setting unit configured to set a position of a target region to which predetermined image processing is to be applied by the imaging apparatus, in the displayed third image, wherein the setting unit converts the position of the target region set in the third image displayed on the display unit based on a display format in which the control unit displays the third image on the display unit, and wherein the communication unit outputs the converted position of the target region to the imaging apparatus.

Further features of the disclosure will become apparent from the following description of exemplary embodiments with reference to the attached drawings.

BRIEF DESCRIPTION OF THE DRAWINGS

FIGS. 7A and 7B are schematic diagrams illustrating an example of lens information to be acquired from dual lenses.

FIGS. 14A, 14B, and 14C are schematic diagrams illustrating an enlargement frame movement command.

DESCRIPTION OF THE EMBODIMENTS

Hereinafter, an exemplary embodiment of the disclosure will be described in detail with reference to the drawings.

Figure 1A:
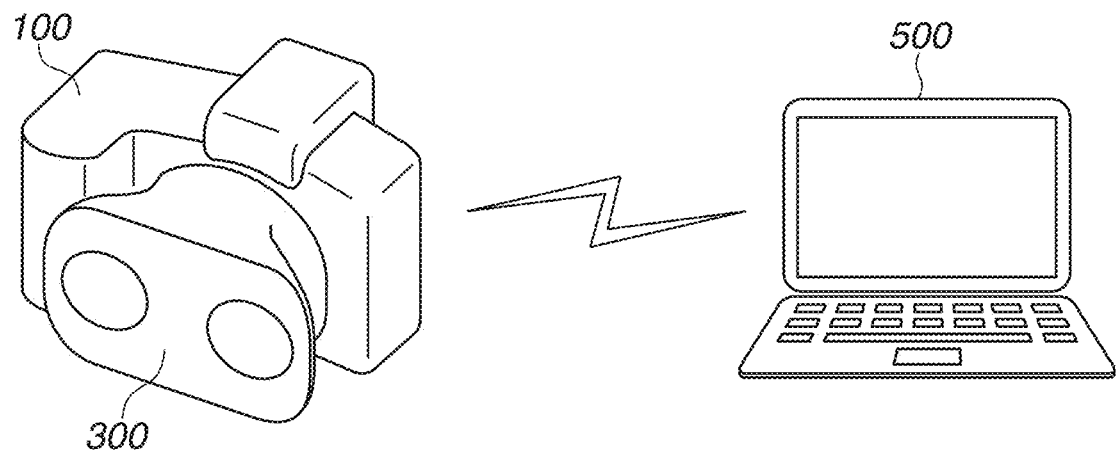
FIGS. 1A and 1B are schematic diagrams illustrating an overall configuration of a system.
Figure 1B:
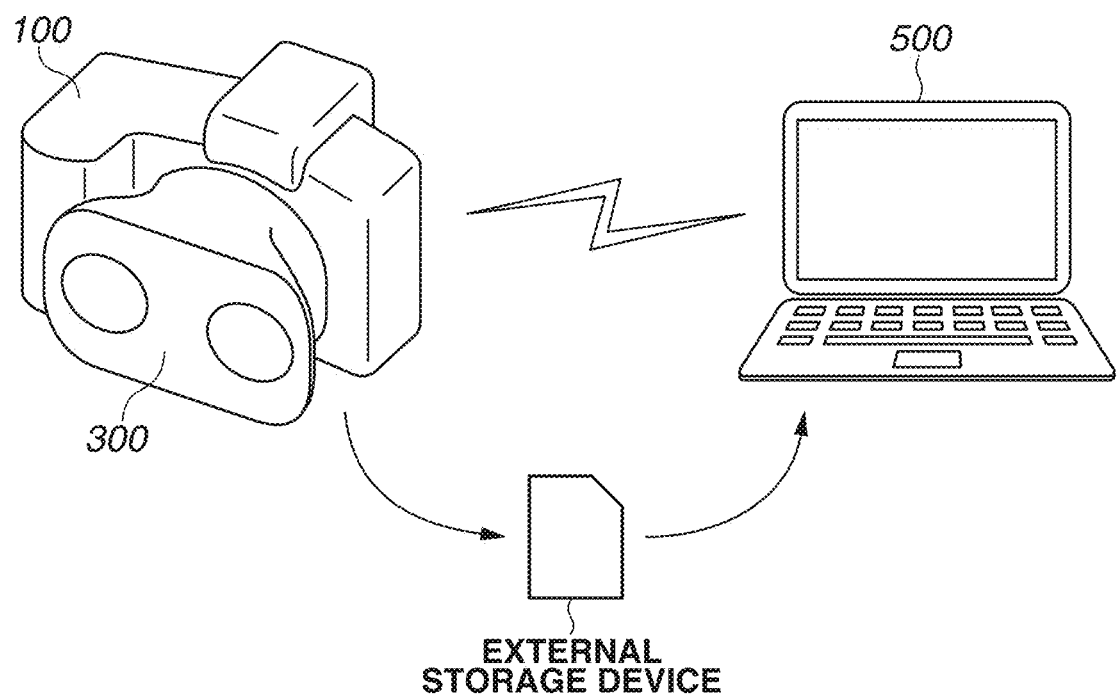

An exemplary embodiment of the disclosure will be described. FIGS. 1A and 1B are schematic diagrams each illustrating an example of an overall configuration of a system according to the present exemplary embodiment. The system according to the present exemplary embodiment includes a digital camera (camera) 100 and a personal computer (PC) 500. A lens unit 300 is attached (connected) to the camera 100. The details of the lens unit 300 will be described below. Being attached with the lens unit 300, the camera 100 can capture two images (still images or moving images) with predetermined parallax at one time. The PC 500 is an information processing apparatus that handles images captured by an imaging apparatus such as the camera 100. FIG. 1A illustrates a configuration in which the camera 100 and the PC 500 are connected wirelessly or by wire so that communication can be performed therebetween. FIG. 1B illustrates a configuration in which images captured by the camera 100 are input to the PC 500 via an external storage device on a file-basis. The external storage device may be connected to both the camera 100 and the PC 500, or the external storage device may be connected to either the camera 100 or the PC 500. For example, the external storage device may be connected to the camera 100, and files of images captured by the camera 100 may be stored in the external storage device. After that, the external storage device may be detached from the camera 100 and connected to the PC 500, and the PC 500 may import the files stored in the external storage device.

Figure 2A:
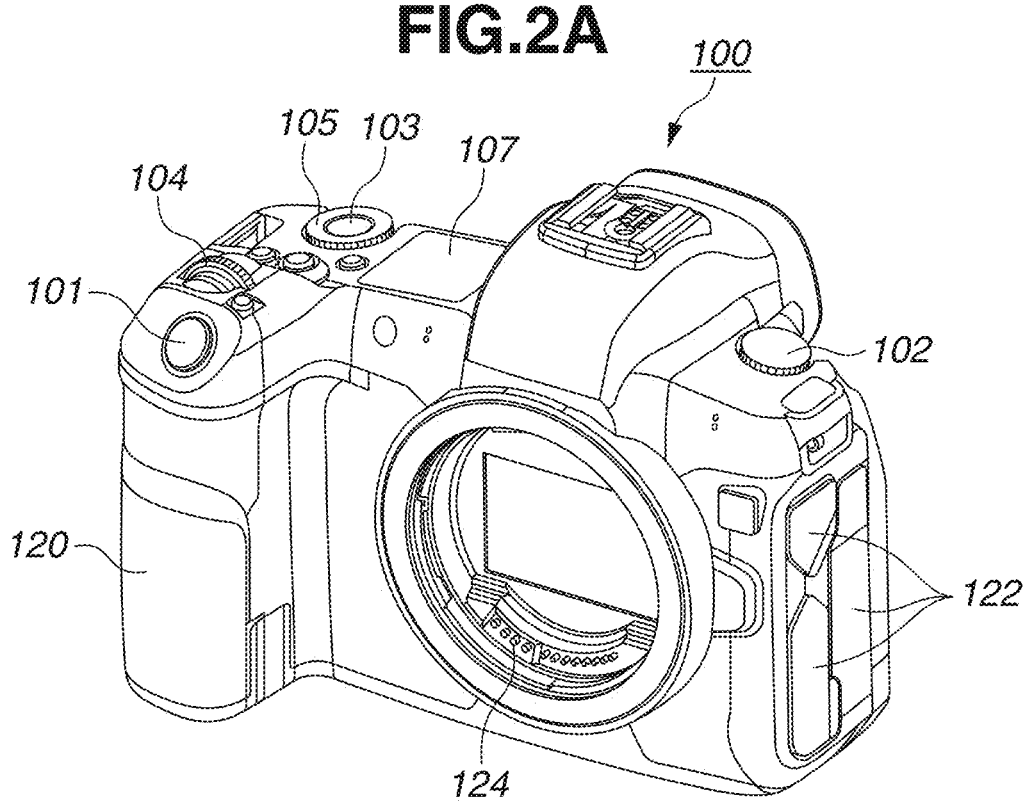
FIGS. 2A and 2B are external views of a camera.
Figure 2B:
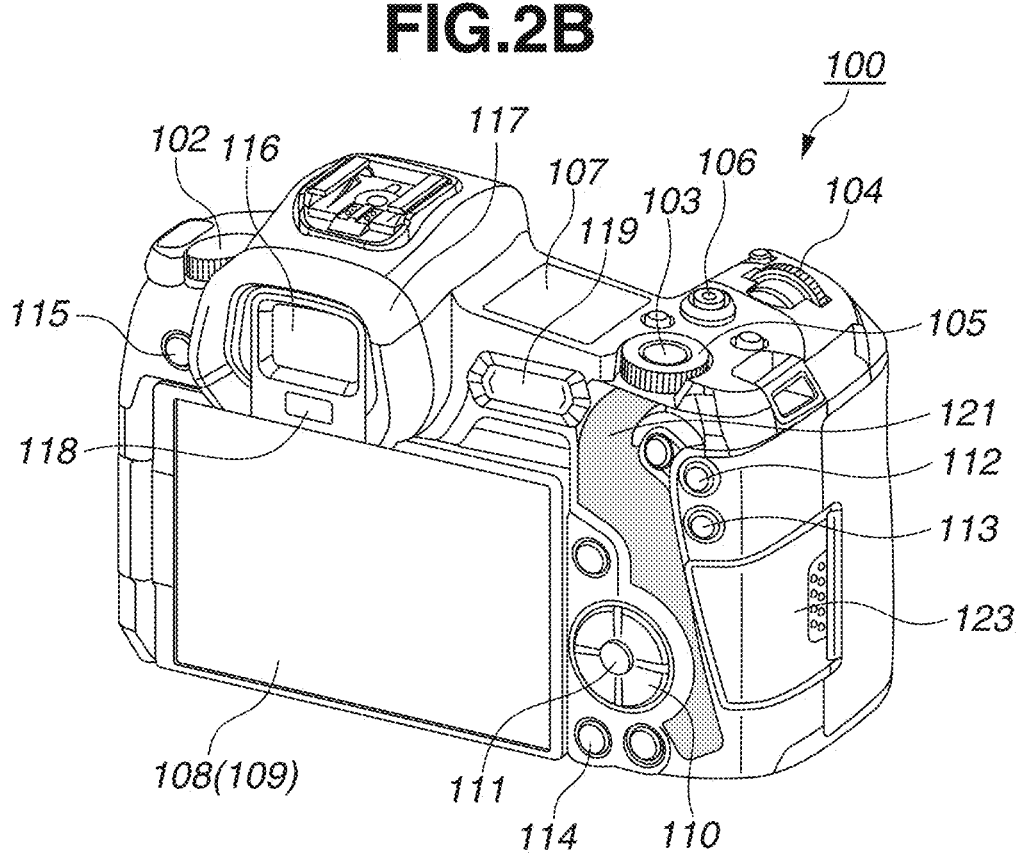

FIGS. 2A and 2B are external views illustrating an example of the external appearance of the camera 100. FIG. 2A is a perspective view of the camera 100 viewed from the front side, and FIG. 2B is a perspective view of the camera 100 viewed from the rear side.

On the top surface, the camera 100 includes a shutter button 101, a power switch 102, a mode selection switch 103, a main electronic dial 104, a sub electronic dial 105, a moving image button 106, and an extra-viewfinder display unit 107. The shutter button 101 is an operation member for issuing an imaging preparation instruction or an imaging instruction. The power switch 102 is an operation member for switching between power-on and power-off of the camera 100. The mode selection switch 103 is an operation member for switching between various modes. The main electronic dial 104 is a rotary operation member for changing a setting value such as a shutter speed and an aperture value. The sub electronic dial 105 is a rotary operation member for moving a selection frame (cursor) and performing image feeding. The moving image button 106 is an operation member for issuing a start or stop instruction of moving image capturing (recording). The extra-viewfinder display unit 107 displays various setting values such as a shutter speed and an aperture value.

On the rear surface, the camera 100 includes a display unit 108, a touch panel 109, a directional key 110, a SET button 111, an autoexposure (AE) lock button 112, an enlargement button 113, a reproduction button 114, a menu button 115, an eyepiece unit 116, an eye approach detection unit 118, and a touch bar 119. The display unit 108 displays an image and various types of information. The touch panel 109 is an operation member for detecting a touch operation on a display surface (touch operation surface) of the display unit 108. The directional key 110 is an operation member including a key that can be pressed upward, downward, leftward, and rightward (four-way key). Processing corresponding to a pressed position of the directional key 110 is performed. The SET button 111 is an operation member to be pressed mainly to determine a selected item. The AE lock button 112 is an operation member to be pressed to fix an exposure state in an imaging standby state. The enlargement button 113 is an operation member for switching between on and off of an enlargement mode in live view display (LV display) of an imaging mode. In a case where the enlargement mode is on, a live view image (LV image) is enlarged or reduced by a user operating the main electronic dial 104. The enlargement button 113 is also used to enlarge a reproduced image in a reproduction mode, or to increase an enlargement ratio. The reproduction button 114 is an operation member for switching between the imaging mode and the reproduction mode. In a case where the camera 100 is in the imaging mode, the camera 100 shifts to the reproduction mode if the reproduction button 114 is pressed, and a latest image among images recorded on a recording medium 227 to be described below can be displayed on the display unit 108.

The menu button 115 is an operation member to be pressed for displaying, on the display unit 108, a menu screen for enabling various settings. The user can intuitively make various settings using the menu screen displayed on the display unit 108, the directional key 110, and the SET button 111. The eyepiece unit 116 is a portion to which an eye of the user is brought close and through which the user looks into an eyepiece viewfinder (look-in viewfinder) 117. Through the eyepiece unit 116, the user can view an image displayed on an electronic viewfinder (EVF) 217 inside the camera 100, which will be described below. The eye approach detection unit 118 is a sensor for detecting whether the user's eye has approached the eyepiece unit 116 (eyepiece viewfinder 117).

The touch bar 119 is a linear touch operation member (line touch sensor) that can receive a touch operation. The touch bar 119 is arranged at a position touch-operable (touchable) by a right thumb in a state in which a grip portion 120 is gripped by a right hand (gripped by a right little finger, a right ring finger, and a right middle finger) in such a manner that a right index finger can press the shutter button 101. In other words, the touch bar 119 is operable in a state in which the user is looking into the eyepiece unit 116 with the eye of the user brought close to the eyepiece viewfinder 117, and is holding the camera 100 ready to press the shutter button 101 (image capturing orientation). The touch bar 119 can receive a tap operation on the touch bar 119 (an operation of touching the touch bar 119 with a finger and removing the finger within a predetermined time period without moving a touch position), and a left-right slide operation on the touch bar 119 (an operation of touching the touch bar 119 and then moving a touch position while touching the touch bar 119). The touch bar 119 is an operation member different from the touch panel 109, and does not include a display function. The touch bar 119 functions as a multifunction bar (M-Fn bar) to which various functions can be allocated, for example.

The camera 100 further includes the grip portion 120, a thumb rest portion 121, a terminal cover 122, a lid 123, and a communication terminal 124. The grip portion 120 is a holding portion formed into a shape that can be easily gripped by a right hand when the user holds the camera 100. The shutter button 101 and the main electronic dial 104 are arranged at positions operable by the right index finger in a state in which the user holds the camera 100 by gripping the grip portion 120 with the right little finger, the right ring finger, and the right middle finger. In addition, the sub electronic dial 105 and the touch bar 119 are arranged at positions operable by the right thumb in a similar state. The thumb rest portion 121 (thumb standby position) is a grip portion provided at a point where the user can naturally place his/her thumb of the right hand gripping the grip portion 120 in a state in which the user operates none of the operation members provided on the rear side of the camera 100. The thumb rest portion 121 is formed of rubber member for strengthening holding force (gripping force). The terminal cover 122 protects a connector of a connection cable that connects the camera 100 to an external device (external apparatus). The lid 123 protects the recording medium 227 and a slot for storing the recording medium 227, which will be described below, by blocking the slot. The communication terminal 124 is a terminal for communicating with a lens unit (a lens unit 200 to be described below, the lens unit 300, etc.) detachably attached to the camera 100.

Figure 3:
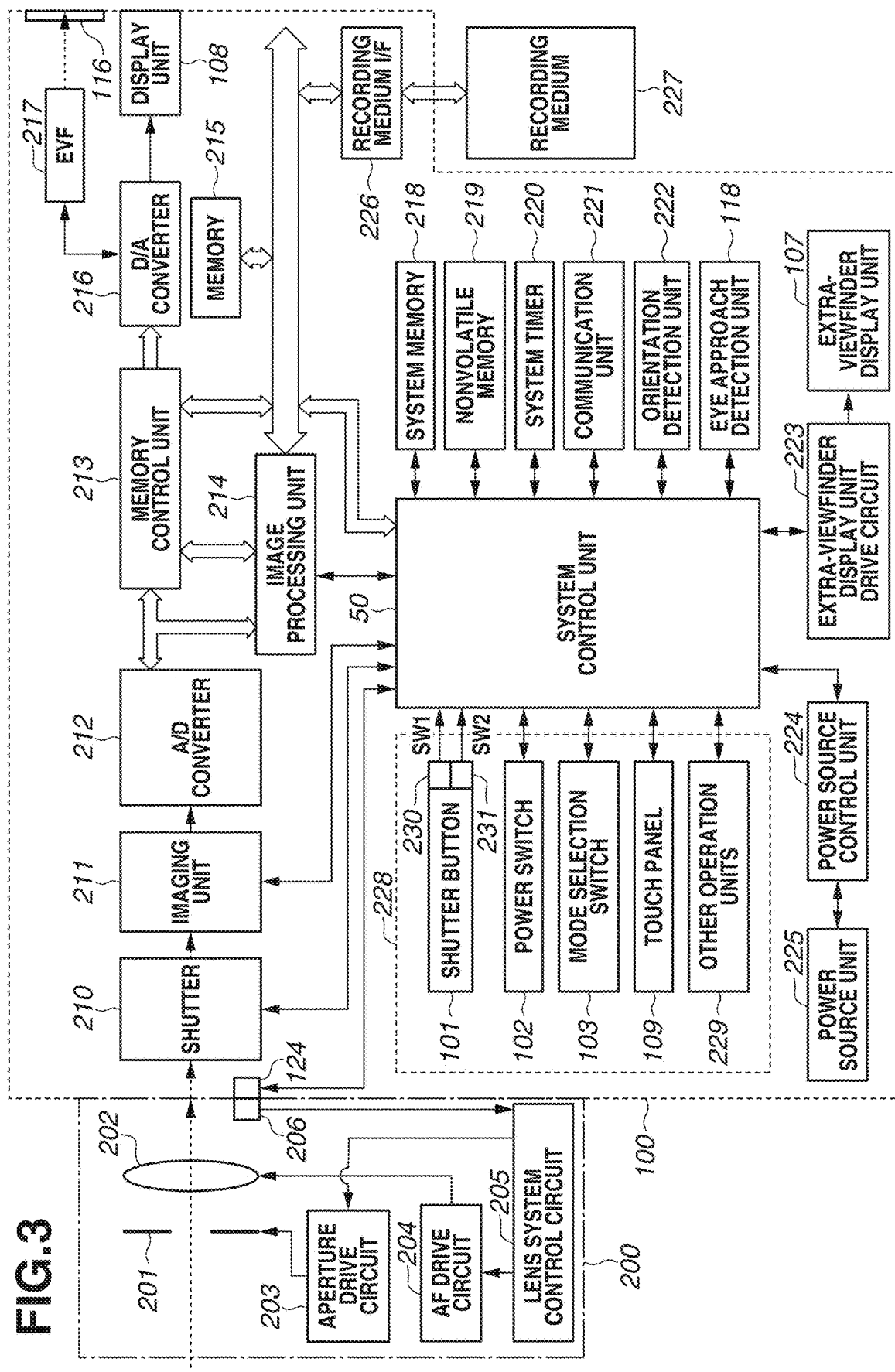
FIG. 3 is a block diagram illustrating a configuration of the camera.

FIG. 3 is a block diagram illustrating an example of a configuration of the camera 100. The same components as those illustrated in FIGS. 2A and 2B are assigned the same reference numerals as those illustrated in FIGS. 2A and 2B, and the description of the components will be appropriately omitted. In FIG. 3, the lens unit 200 is attached to the camera 100.

First, the lens unit 200 will be described. The lens unit 200 is one type of interchangeable lens detachably attached to the camera 100. The lens unit 200 includes a single lens, and serves as an example of a normal lens. The lens unit 200 includes an aperture 201, a lens 202, an aperture drive circuit 203, an autofocus (AF) drive circuit 204, a lens system control circuit 205, and a communication terminal 206.

The aperture 201 has an adjustable aperture diameter. The lens 202 includes a plurality of lenses. The aperture drive circuit 203 adjusts a light amount by controlling the aperture diameter of the aperture 201. The AF drive circuit 204 executes focusing by driving the lens 202. Based on an instruction from a system control unit 50 to be described below, the lens system control circuit 205 controls the aperture drive circuit 203 and the AF drive circuit 204. The lens system control circuit 205 controls the aperture 201 via the aperture drive circuit 203, and executes focusing by changing the position of the lens 202 via the AF drive circuit 204. The lens system control circuit 205 can communicate with the camera 100. Specifically, communication is performed via the communication terminal 206 of the lens unit 200 and the communication terminal 124 of the camera 100. The communication terminal 206 is a terminal for the lens unit 200 to communicate with the camera 100.

Next, the camera 100 will be described. The camera 100 includes a shutter 210, an imaging unit 211, an analog-to-digital (A/D) converter 212, a memory control unit 213, an image processing unit 214, a memory 215, a digital-to-analog (D/A) converter 216, the EVF 217, the display unit 108, and the system control unit 50.

The shutter 210 is a focal plane shutter that can freely control an exposure time of the imaging unit 211 based on an instruction from the system control unit 50. The imaging unit 211 is an image sensor including a charge-coupled device (CCD) sensor or a complementary metal-oxide semiconductor (CMOS) sensor that converts an optical image into an electrical signal. The imaging unit 211 may include an imaging plane phase difference sensor for outputting defocus amount information to the system control unit 50. The A/D converter 212 converts an analog signal output from the imaging unit 211 into a digital signal. The image processing unit 214 performs predetermined processing (pixel interpolation, resize processing such as reduction, color conversion processing, etc.) on data from the A/D converter 212 or data from the memory control unit 213. The image processing unit 214 also performs predetermined calculation processing using data of a captured image. Based on an obtained calculation result, the system control unit 50 performs exposure control and ranging control. By the processing, through-the-lens (TTL) system AF processing, AE processing, and electronic flash pre-emission (EF) processing are performed. The image processing unit 214 further performs predetermined calculation processing using data of a captured image, and the system control unit 50 performs TTL system automatic white balance (AWB) processing based on the obtained calculation result.

Image data from the A/D converter 212 is written into the memory 215 via the image processing unit 214 and the memory control unit 213. Alternatively, image data from the A/D converter 212 is written into the memory 215 via the memory control unit 213 and not via the image processing unit 214. The memory 215 stores image data obtained by the imaging unit 211 and converted by the A/D converter 212 into digital data, and image data to be displayed on the display unit 108 or the EVF 217. The memory 215 has a storage capacity sufficient for storing a predetermined number of still images, and a predetermined time length of a moving image and audio. The memory 215 also serves as a memory (video memory) for image display.

The D/A converter 216 converts image data for display stored in the memory 215 into an analog signal, and supplies the analog signal to the display unit 108 or the EVF 217. The image data for display that has been written into the memory 215 is accordingly displayed on the display unit 108 or the EVF 217 via the D/A converter 216. The display unit 108 and the EVF 217 perform display corresponding to the analog signal from the D/A converter 216. The display unit 108 and the EVF 217 are displays such as a liquid crystal display (LCD) and an organic electroluminescence (EL) display, for example. Digital signals having been once A/D-converted by the A/D converter 212 and stored in the memory 215 are converted into analog signals by the D/A converter 216, and the analog signals are sequentially transferred to the display unit 108 or the EVF 217 and displayed thereon. Live view display is thereby performed.

The system control unit 50 is a control unit including at least one processor and/or at least one circuit. In other words, the system control unit 50 may be a processor, a circuit, or a combination of a processor and a circuit. The system control unit 50 controls the entire camera 100. By executing a program recorded on a nonvolatile memory 219, the system control unit 50 implements each piece of processing in a flowchart, which will be described below. The system control unit 50 also performs display control by controlling the memory 215, the D/A converter 216, the display unit 108, and the EVF 217.

The camera 100 further includes a system memory 218, the nonvolatile memory 219, a system timer 220, a communication unit 221, an orientation detection unit 222, and the eye approach detection unit 118.

For example, a random access memory (RAM) is used as the system memory 218. Constants for operating the system control unit 50, variables, and programs read from the nonvolatile memory 219 are loaded into the system memory 218. The nonvolatile memory 219 is an electrically erasable and recordable memory. For example, an electrically erasable programmable read-only memory (EEPROM) is used as the nonvolatile memory 219. Constants for operating the system control unit 50 and programs are recorded in the nonvolatile memory 219. The programs refer to programs for executing flowcharts to be described below. The system timer 220 is a time measuring unit for measuring a time used for various types of control or a time of a built-in clock.

The communication unit 221 transmits and receives video signals and audio signals to and from an external device connected wirelessly or by wire. The communication unit 221 can also connect to a wireless local area network (LAN) or the Internet. The communication unit 221 can also communicate with the external device via Bluetooth® or Bluetooth Low Energy. The communication unit 221 can transmit an image (including a live image) captured by the imaging unit 211, and an image recorded on the recording medium 227. The communication unit 221 can also receive images and other various types of information from the external device. The orientation detection unit 222 detects the orientation of the camera 100 with respect to a direction of gravitational force. Based on the orientation detected by the orientation detection unit 222, it can be determined whether an image captured by the imaging unit 211 is an image captured with the camera 100 being held in a traverse direction or an image captured with the camera 100 being held in a longitudinal direction. The system control unit 50 can add orientation information corresponding to the orientation detected by the orientation detection unit 222 to an image file of an image captured by the imaging unit 211, or rotate an image to suit the detected orientation. As the orientation detection unit 222, for example, an acceleration sensor or a gyroscope sensor can be used. Using the orientation detection unit 222, the movement of the camera 100 (whether the camera 100 is panning, tilting, lifted, or still, etc.) can also be detected.

The eye approach detection unit 118 can detect the approach of an object of some kind to the eyepiece unit 116 (the eyepiece viewfinder 117). For example, an infrared light proximity sensor can be used as the eye approach detection unit 118. In a case where an object approaches the infrared light proximity sensor, infrared light projected from a light projection unit of the eye approach detection unit 118 is reflected by the object, and the reflected light is received by a light receiving unit of the infrared light proximity sensor. Based on an amount of received infrared light, a distance to the object from the eyepiece unit 116 can be determined. In this manner, the eye approach detection unit 118 performs eye approach detection of detecting a near distance of an object to the eyepiece unit 116. The eye approach detection unit 118 is an eye approach detection sensor for detecting approach (eye approach) and separation (eye withdrawal) of an eye (object) with respect to the eyepiece unit 116. In a case where an object that approaches the eyepiece unit 116 and falls within a predetermined distance from the eyepiece unit 116 is detected from a non-eye approach state (non-approach state), the eye approach detection unit 118 detects that an eye is in proximity to the eyepiece unit 116. On the other hand, in a case where an object detected to be in proximity to the eyepiece unit 116 is separated from the eyepiece unit 116 by a predetermined distance or more from the eye approach state (approach state), the eye approach detection unit 118 detects that the eye has been withdrawn.

A threshold for detecting eye approach and a threshold for detecting eye withdrawal may be different from each other by providing a hysteresis, for example. After the eye approach is detected, the eye stays in the eye approach state until eye withdrawal is detected. After the eye withdrawal is detected, the eye stays in the non-approach state until eye approach is detected. Depending on the state detected by the eye approach detection unit 118, the system control unit 50 switches the display (displayed state) and nondisplay (non-displayed state) of the display unit 108 and the EVF 217. Specifically, at least in a case where the camera 100 is in an imaging standby state and a switching setting of a display destination is set to an automatic switching setting, in the non-eye approach state, the display destination is set to the display unit 108 and the display is set to on, and the EVF 217 is brought into the non-displayed state. In contrast, in the eye approach state, the display destination is set to the EVF 217 and the display is set to on, and the display unit 108 is brought into the non-displayed state. The eye approach detection unit 118 is not limited to an infrared light proximity sensor, and another sensor may be used as the eye approach detection unit 118 as long as the sensor can detect a state that can be regarded as eye approach.

The camera 100 further includes the extra-viewfinder display unit 107, an extra-viewfinder display drive circuit 223, a power source control unit 224, a power source unit 225, a recording medium interface (I/F) 226, and an operation unit 228.

The extra-viewfinder display unit 107 is driven by the extra-viewfinder display drive circuit 223, and displays various setting values of the camera 100 such as a shutter speed and an aperture value. The power source control unit 224 includes a battery detection circuit, a direct current (DC)-DC converter, and a switch circuit for switching a block to be supplied with power. The power source control unit 224 detects whether a battery is attached, the type of battery, and remaining battery capacity. The power source control unit 224 controls the DC-DC converter based on the detection result and an instruction from the system control unit 50, and supplies voltage to components including the recording medium 227 for a time period. The power source unit 225 includes a primary battery such as an alkaline battery or a lithium battery, a secondary battery such as a nickel-cadmium (NiCd) battery, a nickel-metal hydride (NiMH) battery, or a lithium (Li) battery, and an alternating current (AC) adapter. The recording medium I/F 226 is an interface with the recording medium 227 such as a memory card or a hard disc. The recording medium 227 is a memory card or the like for recording a captured image, and includes a semiconductor memory or a magnetic disc. The recording medium 227 may be detachably attached to the camera 100, or may be built into the camera 100.

The operation unit 228 is an input unit for receiving operations from the user (user operations), and is used for inputting various instructions to the system control unit 50. The operation unit 228 includes the shutter button 101, the power switch 102, the mode selection switch 103, the touch panel 109, and other operation units 229. The other operation units 229 include the main electronic dial 104, the sub electronic dial 105, the moving image button 106, the directional key 110, the SET button 111, the AE lock button 112, the enlargement button 113, the reproduction button 114, the menu button 115, and the touch bar 119.

The shutter button 101 includes a first shutter switch 230 and a second shutter switch 231. The first shutter switch 230 is turned on in the middle of an operation of the shutter button 101, i.e., the first shutter switch 230 is turned on by what is called a half press (an imaging preparation instruction), and outputs a first shutter switch signal SW1. In response to the first shutter switch signal SW1, the system control unit 50 starts imaging preparation processing such as the AF processing, AE processing, AWB processing, or EF processing. The second shutter switch 231 is turned on upon completion of an operation of the shutter button 101, i.e., the second shutter switch 231 is turned on by what is called a full press (imaging instruction), and outputs a second shutter switch signal SW2. In response to the second shutter switch signal SW2, the system control unit 50 starts a series of imaging processes starting from signal readout from the imaging unit 211 up to writing of a generated image file including a captured image to the recording medium 227.

The mode selection switch 103 switches an operation mode of the system control unit 50 to one of a still image capturing mode, a moving image capturing mode, and a reproduction mode. The still image capturing mode includes modes such as an automatic imaging mode, an automatic scene determination mode, a manual mode, an aperture priority mode (Av mode), a shutter speed priority mode (Tv mode), and a program AE mode (P mode). The still image capturing mode further includes modes such as various scene modes having different imaging settings for respective imaging scenes, and a custom mode. Via the mode selection switch 103, the user can directly switch the operation mode to any of the above-described imaging modes. Alternatively, the user can switch the operation mode in the following manner using the mode selection switch 103, the user once switches a screen to a list screen of the imaging modes. Then, using the operation unit 228, the user can selectively switch the operation mode to any of a plurality of displayed modes. In a similar manner, the moving image capturing mode may include a plurality of modes.

The touch panel 109 is a touch sensor that detects various touch operations on a display surface of the display unit 108 (operation surface of the touch panel 109). The touch panel 109 and the display unit 108 can be integrally formed. For example, the touch panel 109 is attached to the top layer of the display surface of the display unit 108 in such a manner that light transmittance does not disturb display performed on the display unit 108. Then, an input coordinate on the touch panel 109 and a display coordinate on the display surface of the display unit 108 are associated with each other. This structure can provide a graphical user interface (GUI) that performs display as if the user could directly operate a screen displayed on the display unit 108. As the touch panel 109, a touch panel of any type among the following various types can be used: a resistive touch panel, a capacitive touch panel, a surface acoustic wave touch panel, an infrared touch panel, an electromagnetic induction type touch panel, an image recognition type touch panel, and an optical sensor type touch panel.

Depending on the type, a touch panel may detect a touch by detecting contact with the touch panel 109 while another touch panel may detect a touch by detecting approach of a finger or a stylus to the touch panel 109. A touch panel of any type may be used.

The system control unit 50 can detect the following operations performed on the touch panel 109 or states thereof.

An operation of a finger or a stylus that has not been in touch with the touch panel 109 newly touching the touch panel 109, i.e., the start of a touch on the touch panel 109 (hereinafter, referred to as Touch-Down).

A state in which a finger or a stylus is in touch with the touch panel 109 (hereinafter, referred to as Touch-On).

An operation of a finger or a stylus moving over the touch panel 109 while being in touch with the touch panel 109 (hereinafter, referred to as Touch-Move).

An operation of removing (releasing) a finger or a stylus that has been in touch with the touch panel 109 from the touch panel 109, i.e., the end of a touch on the touch panel 109 (hereinafter, referred to as Touch-Up).

A state in which nothing touches the touch panel 109 (hereinafter, referred to as Touch-Off).

If the Touch-Down is detected, the Touch-On is simultaneously detected. After the Touch-Down, normally, the Touch-On continues to be detected until the Touch-Up is detected. The Touch-On is simultaneously detected in a case where the Touch-Move is detected. Even if the Touch-On is detected, the Touch-Move is not detected unless a touch position moves. After the Touch-Up of all the fingers or styluses that have been in touch is detected, the Touch-Off is detected.

The operations and states, and a position coordinate on the touch panel 109 at which a finger or a stylus is in touch are notified to the system control unit 50 via an internal bus. Based on the notified information, the system control unit 50 determines the type of an operation (touch operation) performed on the touch panel 109. As for the Touch-Move, a moving direction of a finger or a stylus moving on the touch panel 109 can be determined for each of vertical and horizontal components on the touch panel 109 based on a change in position coordinate. In a case where it is detected that the Touch-Move is performed for a predetermined distance or more, it is determined that a slide operation has been performed. An operation of swiftly moving a finger by a certain amount of distance with the finger being in touch with the touch panel 109, and removing the finger in this state will be referred to as a flick. In other words, the flick is an operation of swiftly moving the finger over the touch panel 109 like a flip. If it is detected that the Touch-Move has been performed at a predetermined speed or more for a predetermined distance or more, and the Touch-Up is detected in this state, it is determined that a flick has been performed (it can be determined that a flick has been performed subsequent to the slide operation). Furthermore, a touch operation of touching a plurality of points (e.g. two points) concurrently (multi-touch), and bringing the touch positions closer to each other will be referred to as pinch-in, and a touch operation of bringing the touch positions away from each other will be referred to as pinch-out. The pinch-out and the pinch-in will be collectively referred to as a pinch operation (or simply as pinch).

Figure 4:
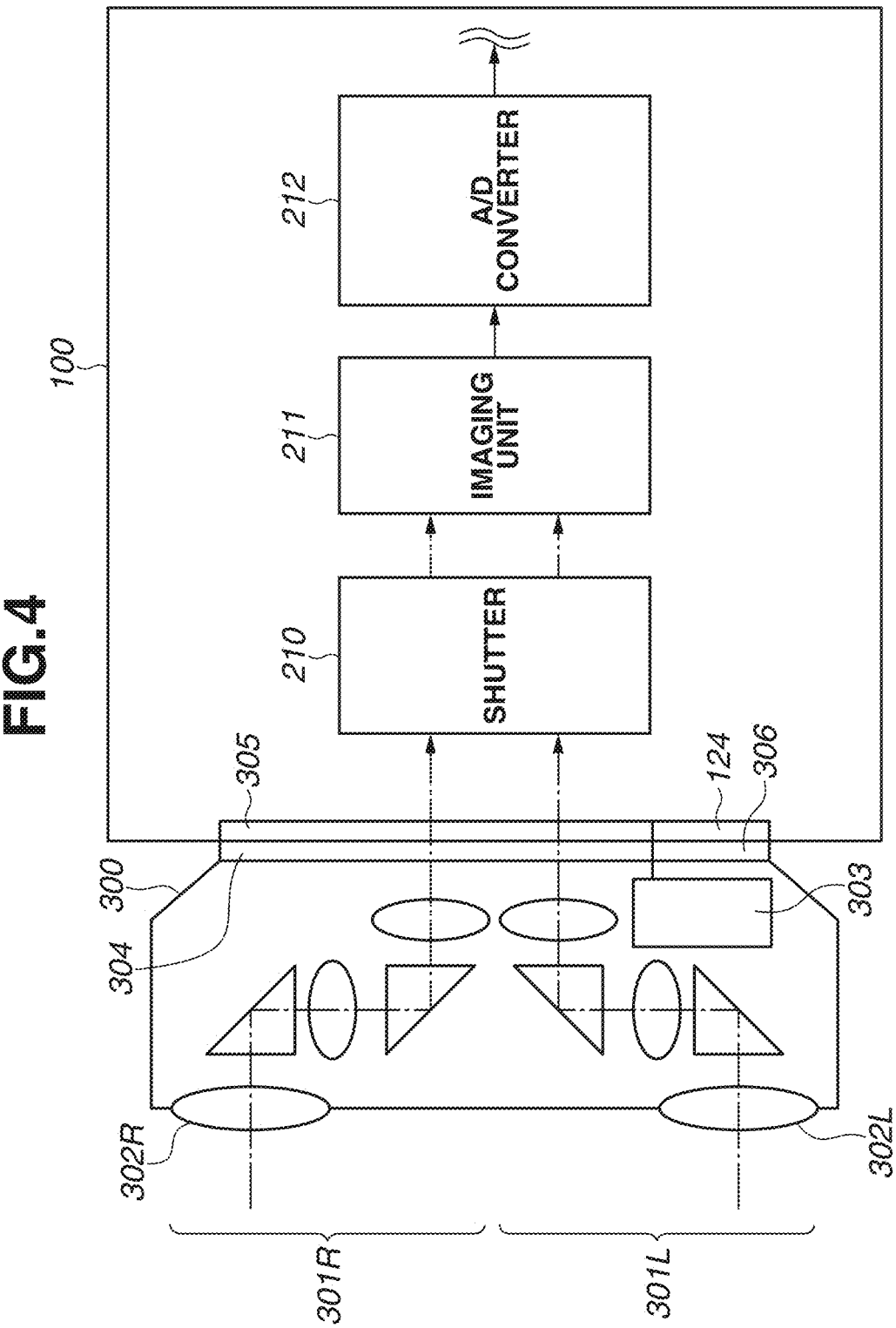
FIG. 4 is a schematic diagram illustrating a configuration of a lens unit.

FIG. 4 is a schematic diagram illustrating an example of a configuration of the lens unit 300. FIG. 4 illustrates a state in which the lens unit 300 is attached to the camera 100. Among the components of the camera 100 that are illustrated in FIG. 4, the same components as those illustrated in FIG. 3 are assigned the same reference numerals as those illustrated in FIG. 3, and the description of the components will be appropriately omitted.

The lens unit 300 is one type of interchangeable lens that is detachably attached to the camera 100.

The lens unit 300 corresponds to dual lenses that can capture a right image and a left image with parallax. In the present exemplary embodiment, the lens unit 300 includes two optical systems, and each of the two optical systems can capture an image in a range with a wide viewing angle of about 180 degrees. Specifically, each of the two optical systems of the lens unit 300 can capture an image of subjects existing in a viewing field (field angle) corresponding to 180 degrees in a left-right direction (horizontal angle, azimuth angle, yaw angle) and 180 degrees in an up-down direction (a vertical angle, elevation/depression angle, pitch angle). In other words, each of the two optical systems can capture images in a range of a hemisphere toward the front.

The lens unit 300 includes a right eye optical system 301R including a plurality of lenses and a reflection mirror, a left eye optical system 301L including a plurality of lenses and a reflection mirror, and a lens system control circuit 303. The right eye optical system 301R is an example of a first optical system and the left eye optical system 301L is an example of a second optical system. The right eye optical system 301R includes a lens 302R arranged on a subject side, and the left eye optical system 301L includes a lens 302L arranged on the subject side. The lens 302R and the lens 302L are oriented in the same direction, and optical axes thereof are approximately parallel.

The lens unit 300 corresponds to dual lenses (VR180 lens) for obtaining an image of VR180, which is one of formats of virtual reality (VR) images that enable dual-lens stereopsis. In the present exemplary embodiment, the right eye optical system 301R and the left eye optical system 301L in the lens unit 300 each includes a fisheye lens that can capture an image in the range of approximately 180 degrees. Alternatively, the range that can be covered by the lens included in each of the right eye optical system 301R and the left eye optical system 301L may be about 160 degrees, which is narrower than the range of 180 degrees. The lens unit 300 can form a right image (first image) formed via the right eye optical system 301R, and a left image (second image) formed via the left eye optical system 301L, on one or two image sensors of a camera to which the lens unit 300 is attached. An image in which the first image and the second image obtained via the lens unit 300 are arranged side by side will be referred to as a dual-lens image.

The lens unit 300 is attached to the camera 100 via a lens mount portion 304 and a camera mount portion 305 of the camera 100. The system control unit 50 of the camera 100 and the lens system control circuit 303 of the lens unit 300 are thereby electrically connected via the communication terminal 124 of the camera 100 and a communication terminal 306 of the lens unit 300.

In the present exemplary embodiment, the right image formed via the right eye optical system 301R, and the left image formed via the left eye optical system 301L are simultaneously formed (as a set) on the imaging unit 211 of the camera 100. In other words, two optical images formed by the right eye optical system 301R and the left eye optical system 301L are formed on one image sensor. The imaging unit 211 converts a formed subject image (optical signal) into an analog electrical signal. By using the lens unit 300 in this manner, from two points (optical systems) corresponding to the right eye optical system 301R and the left eye optical system 301L, two images with parallax can be simultaneously acquired (as a set). By VR-displaying the acquired images separately as an image for a left eye and an image for a right eye, the user can view a stereoscopic VR image in the range of approximately 180 degrees. In other words, the user can stereoscopically view an image of VR180.

The VR image refers to an image that can be subjected to VR display, which will be described below. VR images include an omnidirectional image (360-degree image) captured by an omnidirectional camera (360-degree camera) and a panorama image having an image range (effective image range) wider than a display range that can be displayed on a display unit at one time. The VR images are not limited to a still image, and also includes a moving image and a live image (image acquired in almost real time from a camera). The VR image has an image range (effective image range) corresponding to a viewing field of 360 degrees in the left-right direction and 360 degrees in the up-down direction at the maximum. The VR images also include an image having a broader field angle than a field angle in which a normal camera can perform image capturing, and an image having a wider image range than a display range that can be displayed on a display unit at one time, even if the viewing fields of the images are less than 360 degrees in the left-right direction and less than 360 degrees in the up-down direction. An image captured by the camera 100 using the above-described lens unit 300 is one type of VR image. The VR image can be VR-displayed by setting a display mode of a display device (display device that can display VR images) to "VR view", for example. By VR-displaying a VR image having a field angle of 360 degrees and the user changing the orientation of the display device in the left-right direction (horizontal rotation direction), the user can view an omnidirectional image seamless in the left-right direction.

The VR display (VR view) refers to a display method (display mode) with a changeable display range that displays an image within a viewing field range corresponding to the orientation of the display device, of the VR image. The VR display includes "monocular VR display (monocular VR view)" of displaying one image by performing deformation (distortion correction) of mapping a VR image on a virtual sphere. The VR display also includes "dual-lens VR display (dual-lens VR view)" of displaying a VR image for a left eye and a VR image for a right eye side by side in left and right regions after performing deformation of mapping the VR images on the respective virtual spheres. By performing "dual-lens VR display" using the VR image for the left eye and the VR image for the right eye that have parallax, the VR images can be stereoscopically viewed. In both types of VR display, for example, in a case where the user wears a display device such as a head-mounted display (HMD), an image in a viewing field range corresponding to the orientation of the face of the user is displayed. For example, of a VR image, an image in a viewing field range centered on 0 degree in the left-right direction (a specific direction, for example, north) and 90 degrees in the up-down direction (90 degrees from the zenith, i.e., horizontal) is displayed at a certain time point. If the orientation of the display device is inverted from this state (for example, the orientation of a display surface is changed from south to north), of the same VR image, the display range is changed to an image in a viewing field range centered on 180 degrees in the left-right direction (an opposite direction, for example, south) and 90 degrees in the up-down direction. More specifically, if the face turns southward from the north (i.e., turns rearward) in a state in which the user wears an HMD, an image displayed on the HMD is also changed from a north-facing image to a south-facing image. A VR image captured using the lens unit 300 according to the present exemplary embodiment is a captured image in the range of about 180 degrees toward the front, and an image in the range of about 180 degrees toward the rear does not exist. When such an image is VR-displayed, in a case where the orientation of a display device is changed to a side on which no image exists, a blank region is displayed.

By VR-displaying a VR image in this manner, the user can visually feel as if the user be inside the VR image (VR space) (immersive feeling). The display method of the VR image is not limited to a method of changing the orientation of a display device. For example, a display range may be moved (scrolled) in response to a user operation performed via a touch panel or a directional button. During VR display (when the display mode is set to "VR view"), a display range may be changed in response to Touch-Move on a touch panel, a drag operation performed with a mouse, or a press of a directional button, in addition to the change of the display range caused by an orientation change. A smartphone attached to VR goggles (head mount adapter) is one type of HMD.

Figure 5:
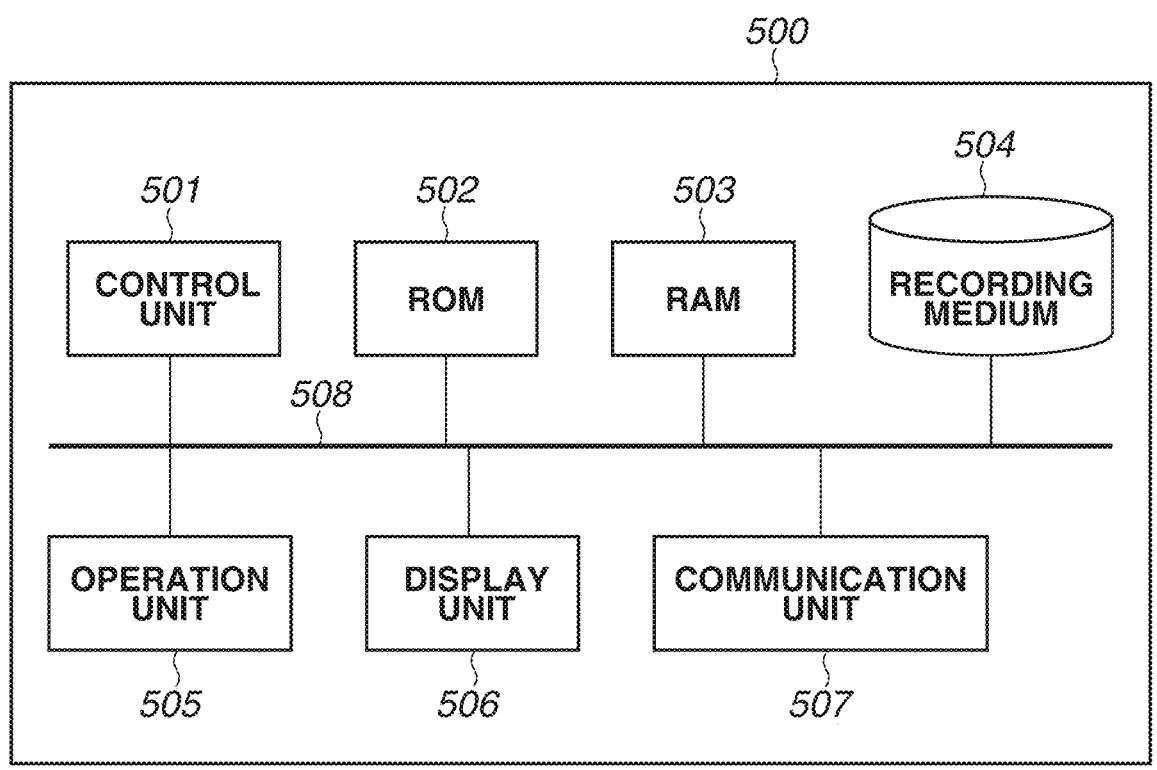
FIG. 5 is a block diagram illustrating a configuration of a personal computer (PC).

FIG. 5 is a block diagram illustrating an example of a configuration of the PC 500. A control unit 501 is a central processing unit (CPU), for example, and controls the entire PC 500. A read only memory (ROM) 502 stores programs and parameters in a non-transitory manner A random access memory (RAM) 503 temporarily stores programs and data supplied from an external device. A recording medium 504 is a hard disc or a flash memory fixedly installed in the PC 500, or an optical disc, a magnetic card, an optical card, an integrated circuit (IC) card, or a memory card that is detachably attached to the PC 500. A file of an image captured by the camera 100 is read from the recording medium 504. An operation unit 505 receives a user operation performed on the PC 500. An operation member to be used by the user for performing operations may be a button or a touch panel that is provided on the PC 500, or may be a keyboard or a mouse detachably attached to the PC 500.

A display unit 506 displays data stored in the PC 500 and data supplied from the outside. The display unit 506 may be part of the PC 500, or may be a separate display device independent of the PC 500. A communication unit 507 performs communication with an external device such as the camera 100. A system bus 508 connects between the components of the PC 500 in such a manner that communication can be performed therebetween.

Features of dual-lens images captured by the camera 100 to which the lens unit 300 (dual lenses) is attached will be described. In the case of the lens unit 200 (normal single lens), an image inverted vertically and horizontally from an actual view (an image rotated by 180 degrees) is formed on the imaging unit 211. Thus, an image suitable for the actual view is acquired (captured) by rotating the entire formed image by 180 degrees. On the other hand, in the case of the lens unit 300 (dual lenses), a right image and a left image are each formed on the imaging unit 211 while being rotated by 180 degrees from the actual view. Arrangement of the right image and the left image is not specifically limited. In the present exemplary embodiment, the right image is formed on the right side and the left image is formed on the left side on the imaging unit 211. Then, if the entire formed image (image including the right image and the left image) is rotated by 180 degrees as in the case of the lens unit 200 (normal single lens), while the right image and the left image each appear in a manner consistent with an actual view, the positions of the right image and the left image are swapped. More specifically, a positional relationship between the right and left images is inverted, and an image in which the right image is arranged on the left side and the left image is arranged on the right side is captured. For this reason, even if a captured image is displayed as-is (without considering the swapped positions), a stereoscopic view cannot be obtained. In the present exemplary embodiment, such an image is enabled to be stereoscopically viewed.

The control according to the present exemplary embodiment will be described. The description will be given of an example in which the camera 100 and the PC 500 are connected with each other in such a manner that communication can be performed therebetween, a live view image captured by the camera 100 is transmitted to the PC 500, and the PC 500 displays the live view image on the display unit 506.

Figure 6:
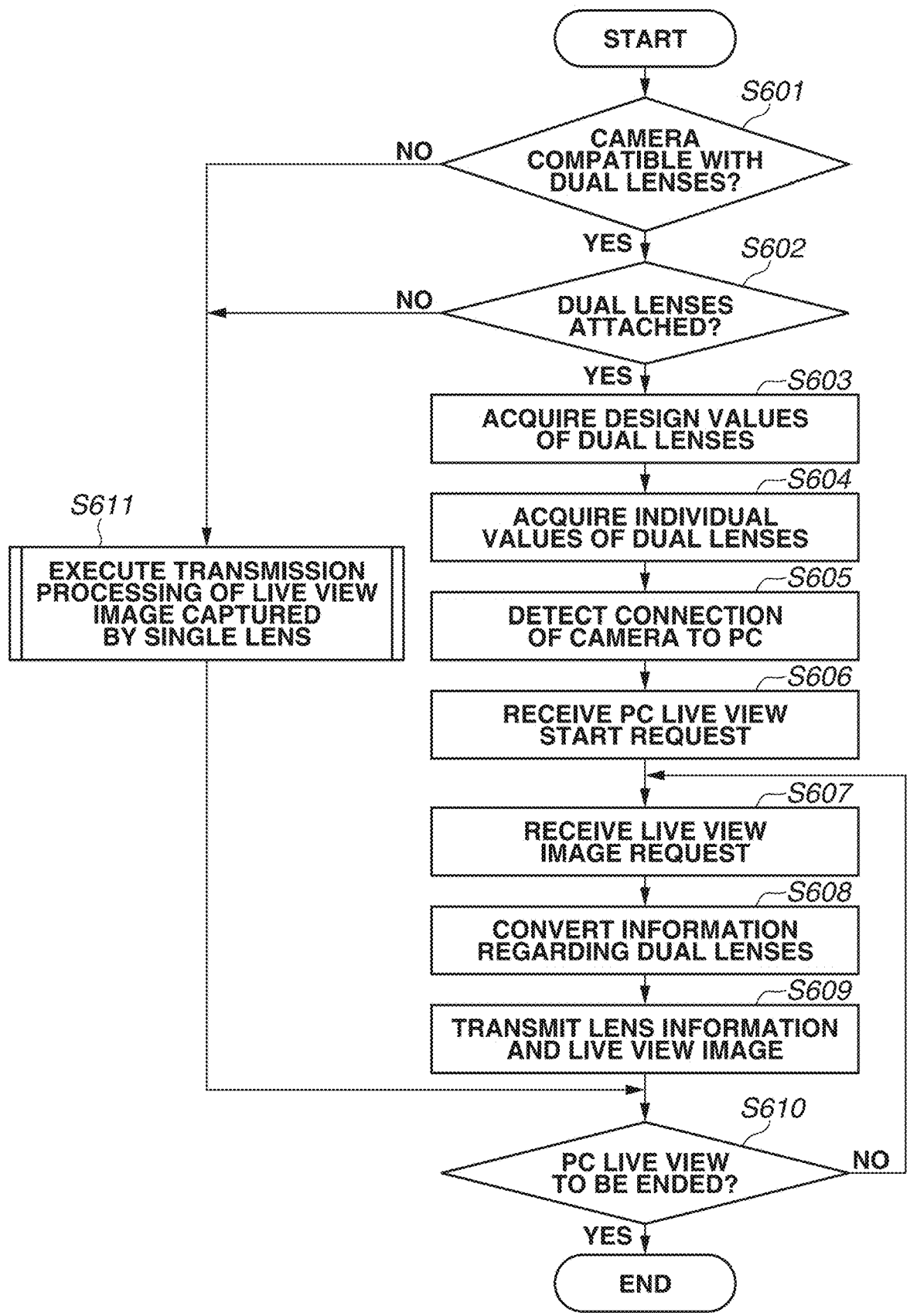
FIG. 6 is a flowchart illustrating an operation of the camera.

FIG. 6 is a flowchart illustrating an example of an operation of the camera 100. The operation is an operation of transmitting a live view image from the camera 100 for displaying the live view image on the PC 500. The operation is implemented by the system control unit 50 loading a program recorded on the nonvolatile memory 219 into the system memory 218 and executing the program. For example, if the camera 100 starts up, the operation illustrated in FIG. 6 starts. The operation illustrated in FIG. 6 is an operation for a function of displaying a live view image captured by a camera on a display unit of a PC (PC live view). The operation illustrated in FIG. 6 is executed when the camera 100 is in an imaging standby state. In a case where a recording start instruction is input from the PC 500 during operation of the PC live view, still image capturing or moving image capturing is executed.

In step S601, the system control unit 50 determines whether the camera 100 is compatible with dual lenses (e.g., the lens unit 300). For example, the system control unit 50 determines whether a version of firmware of the system control unit 50 is a version compatible with the dual lenses. In a case where it is determined that the camera 100 is compatible with the dual lenses (YES in step S601), the processing proceeds to step S602. In a case where it is determined that the camera 100 is not compatible with the dual lenses (NO in step S601), the processing proceeds to step S611.

In step S602, the system control unit 50 determines whether the dual lenses are attached to the camera 100. In a case where it is determined that the dual lenses are attached (YES in step S602), the processing proceeds to step S603. In a case where it is determined that the dual lenses are not attached (NO in step S602), the processing proceeds to step S611. Also in a case where the dual lenses are attached from a state in which the dual lenses are not attached, the processing proceeds to step S603. In a case where the dual lenses are detached from a state in which the dual lenses are attached, the processing proceeds to step S611.

In step S603, the system control unit 50 acquires design values of the attached (connected) dual lenses from the dual lenses. The design values are design parameters and are to be used in left-right swapping and equirectangular conversion, which will be described below. For example, an image circle position, an image circle diameter, a field angle, and a distortion correction coefficient illustrated in FIG. 7B are acquired.

In step S604, the system control unit 50 acquires individual values of the attached (connected) dual lenses from the dual lenses. An individual value is a parameter unique to a lens unit, and is a manufacturing error, for example. For example, an image circle positional shift, an optical axis tilt, and an image magnification deviation illustrated in FIG. 7B are acquired. In a case where the individual values are used, image processing can be performed more accurately than in a case where the design values are used.

Lens information to be acquired from the lens unit 300 will be described.

FIG. 7A is a schematic diagram illustrating an example of lens information to be acquired from dual lenses. The lens information includes:

1. Lens design value
2. Lens individual value
3. Lens flag
4. Lens focal length, and
5. Lens temperature.

The lens design value is a design value for performing aberration correction. In a manufacturing process of dual lenses, an error such as decentering or tilt of the lenses occurs in each of the two optical systems (the left eye optical system 301L and the right eye optical system 301R). If the left-right swapping or equirectangular conversion is performed without considering the error, the quality of dual-lens VR display declines, and good stereoscopic view becomes difficult. The lens individual value is a measurement result of an error detected in the manufacturing process of the dual lenses. The details of the lens design value and the lens individual value will be described below with reference to FIG. 7B.

The lens flag is a flag indicating that dual lenses are attached. The lens focal length indicates a distance to an image sensor (image forming position) from a "principal point" being the center of a lens. The lens focal length may be a parameter common to the two optical systems (the left eye optical system 301L and the right eye optical system 301R) of dual lenses, or may be prepared for each optical system. For the system control unit 50 to perform high-quality dual-lens VR display by accurately performing the left-right swapping and equirectangular conversion, a minute (highly-precise) lens focal length is required. The lens temperature indicates the temperature of the dual lenses, and is used for identifying an environmental temperature in image capturing.

FIG. 7B is a schematic diagram illustrating details of the lens design value and the lens individual value. In the present exemplary embodiment, the lens design value and the lens individual value are used in the left-right swapping and equirectangular conversion.

The lens design value includes:
1. Image circle position
2. Image circle diameter
3. Field angle, and
4. Distortion correction coefficient.

The image circle position indicates an optical axis central coordinate of an optical system in a captured image, and is prepared for each of the two optical systems (the left eye optical system 301L and the right eye optical system 301R) of the dual lenses. In other words, the image circle position indicates a central coordinate of an image circle (circular fisheye image) formed on an image sensor, and is prepared for each of the right image and the left image. An origin of a coordinate is set to the center of the image sensor (the center of a captured image), for example. The image circle position includes a coordinate in a horizontal direction and a coordinate in a vertical direction. Various types of information regarding an optical axis center of an optical system in a captured image can be used as the image circle position. For example, a distance to the optical axis center from a predetermined position (center or top-left corner) in an image can be used.

The image circle diameter indicates a diameter of the image circle (circular fisheye image) formed on an image sensor.

The field angle indicates a field angle of the image circle (circular fisheye image) formed on an image sensor. The distortion correction coefficient indicates a ratio of a design image height to an ideal image height of a lens. The distortion correction coefficient may be set for each image height, and a distortion correction coefficient for an image height for which a distortion correction coefficient is unset may be calculated by interpolation calculation that uses a plurality of distortion correction coefficients. A polynomial approximating a relationship between the image height and the distortion correction coefficient may be set. The image circle diameter, the field angle, and the distortion correction coefficient may be parameters common to the two optical systems (the left eye optical system 301L and the right eye optical system 301R) of dual lenses, or may be prepared for each of the two optical systems.

When displaying a circular fisheye image, the PC 500 may display a magic window on the circular fisheye image. The magic window is a display item indicating a region to be extracted (first) for monocular VR display. For example, the magic window is displayed based on an image circle position, an image circle diameter, and a field angle. The display quality of the magic window can be thereby enhanced. To appropriately display the magic window, the PC 500 uses an image circle position, an image circle diameter, and a field angle after appropriately editing the values. For example, the PC 500 multiplies an image circle position or an image circle diameter by a coefficient.

The lens individual value includes:
5. Image circle positional shift
6. Optical axis tilt, and
7. Image magnification deviation.

These pieces of information are prepared by performing measurement for each of the two optical systems (the left eye optical system 301L and the right eye optical system 301R) of the dual lenses.

The image circle positional shift indicates a deviation from a design value of the central coordinate of an image circle (circular fisheye image) formed on an image sensor. For example, the image circle positional shift includes a deviation in the horizontal direction and a deviation in the vertical direction. When an origin is set to a coordinate of a design value (two-dimensional coordinate including a coordinate in the horizontal direction and a coordinate in the vertical direction), a deviation in the horizontal direction is indicated by a coordinate in the horizontal direction, and a deviation in the vertical direction is indicated by a coordinate in the vertical direction. The optical axis tilt indicates a deviation from a design value of the direction of an optical axis on the subject side. For example, the optical axis tilt includes a deviation in the horizontal direction and a deviation in the vertical direction. The deviation in each of the directions is indicated by an angle. The image magnification deviation indicates a deviation from a design value of a size of an image circle (circular fisheye image) formed on an image sensor. The deviation is indicated by a ratio with respect to a design value, for example.

Information included in the lens information is not limited to the above-described information. For example, the lens information may include boundary positions of a right image and a left image in a captured image. The boundary position is a position of a rim of a circular fisheye image, for example, and is a position indicated by a shift amount 905, 906, 909, or 910 illustrated in FIG. 9A, which will be described below. The lens information may include a midpoint coordinate between a right image and a left image in a captured image. In many cases, the midpoint coordinate coincides with the central coordinate of a captured image. The lens information may include information indicating a region of the magic window (for example, a coordinate of a top-left corner of the magic window, a width of the magic window, and a height of the magic window). The lens information may include correction data for enhancing the accuracy of the left-right swapping or equirectangular conversion (for example, correction value obtained by calibration of dual lenses).

In step S605, the system control unit 50 detects connection of the camera 100 to the PC 500. In step S606, the system control unit 50 receives a PC live view start request from the PC 500. In step S607, the system control unit 50 receives a live view image request from the PC 500. As described below, the live view image request includes information designating resolution (resolution information) of a live view image to be transmitted. The system control unit 50 executes processing in step S609 to transmit a live view image with the designated resolution to the PC 500.

In step S608, the system control unit 50 converts the information (lens information regarding dual lenses) acquired in steps S603 and S604 so that the acquired information is suitable for a coordinate system of a live view image. Because an image to be captured (image to be recorded in an image file) and a live view image differ in resolution, the information acquired in steps S603 and S604 cannot be directly used in image processing of a live view image. Thus, in the present exemplary embodiment, the system control unit 50 converts the lens information into information suitable for a coordinate system of a live view image.

In step S609, the system control unit 50 transmits the lens information converted in step S608 and a live view image to the PC 500. The system control unit 50 converts the resolution of the live view image based on the resolution information acquired in step S607, and transmits the live view image to the PC 500. In the present exemplary embodiment, the system control unit 50 of the camera 100 converts the lens information, but the control unit 501 of the PC 500 may convert the lens information. In this case, unconverted lens information and parameters for conversion of the lens information are transmitted to the PC 500. In step S610, the system control unit 50 determines whether to end PC live view. For example, in a case where connection between the camera 100 and the PC 500 is canceled, or the user issues an end instruction of the PC live view to the camera 100 or the PC 500, the system control unit 50 determines to end the PC live view. In a case where it is determined that the PC live view is to be ended (YES in step S610), the operation illustrated in FIG. 6 is ended. In a case where it is determined that the PC live view is not to be ended (NO in step S610), the processing returns to step S607.

In a case where a single lens is attached to the camera 100 (NO in step S601 or S602), the processing in step S611 is performed. In step S611, the system control unit 50 transmits a live view image captured by the single lens to the PC 500. Because the processing in step S611 is similar to conventional processing of transmitting a live view image captured by a single lens to an external device, a detailed description will be omitted.

In the present exemplary embodiment, when transmitting a live view image captured by a single lens to the PC 500, the system control unit 50 does not acquire information (design value, individual value, etc.) regarding the attached single lens from the single lens, and does not transmit the information to the PC 500, either.

Figure 8:
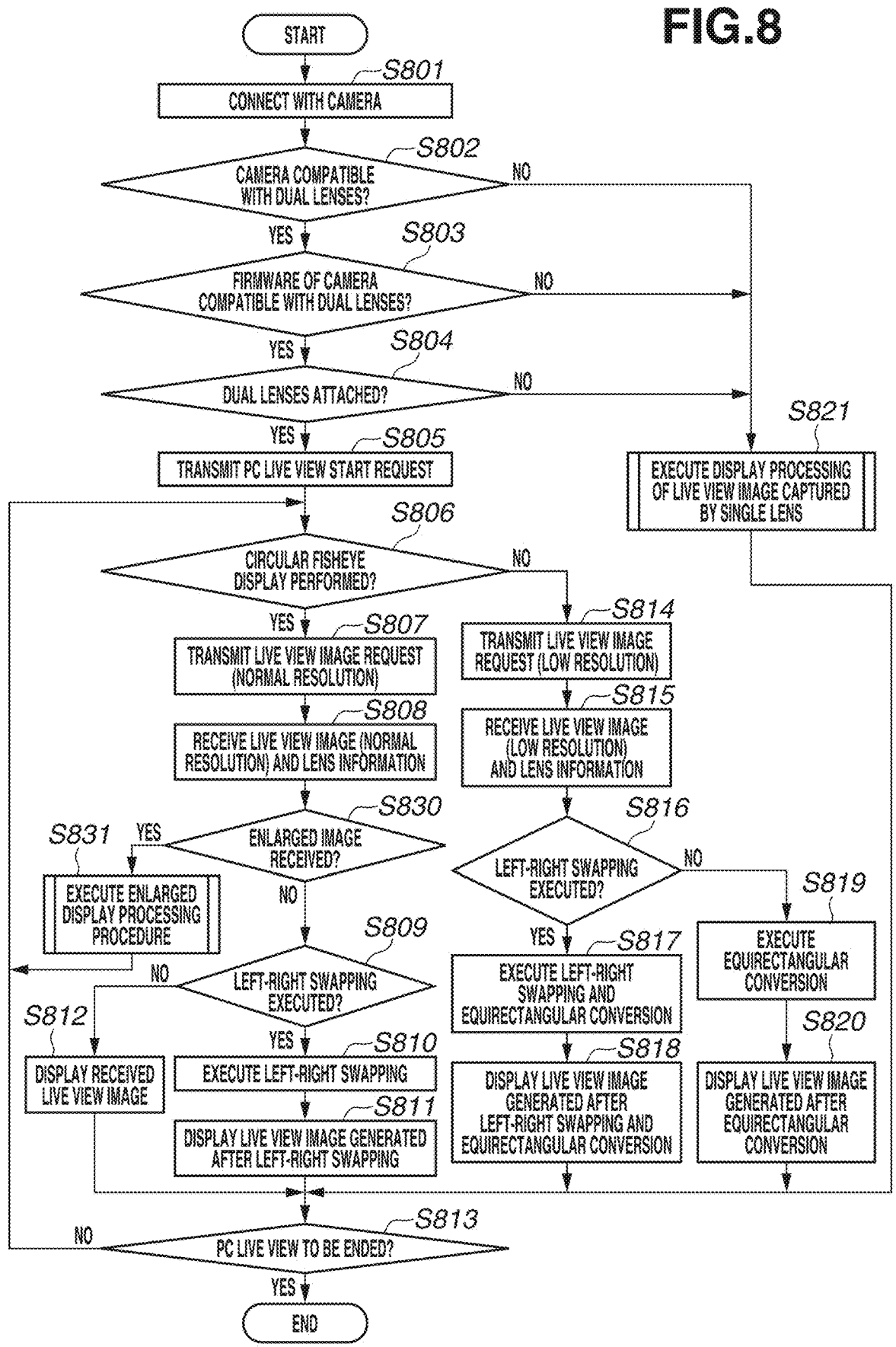
FIG. 8 is a flowchart illustrating an example of an operation of the PC.

FIG. 8 is a flowchart illustrating an example of an operation of the PC 500. The operation is control for executing PC live view display of displaying a live view image of the camera 100 on the PC 500. The operation is implemented by the control unit 501 loading a program (application program) recorded on the ROM 502 into the RAM 503 and executing the program. For example, if the user issues a startup instruction of a specific application to the PC 500, the operation illustrated in FIG. 8 starts. The operation illustrated in FIG. 8 is an operation for a function of displaying a live view image captured by a camera on a display unit of a PC (PC live view).

In step S801, a camera (e.g., the camera 100) is connected to the PC 500, and the control unit 501 detects that the camera has been connected to the PC 500.

In step S802, the control unit 501 determines whether the camera connected in step S801 is a camera compatible with dual lenses (e.g., the lens unit 300). For example, the control unit 501 acquires model information of the connected camera from the camera, and determines whether the camera is a camera compatible with dual lenses based on the acquired model information. In a case where it is determined that the camera is compatible with dual lenses (YES in step S802), the processing proceeds to step S803. In a case where it is determined that the camera is incompatible with dual lenses (NO in step S802), the processing proceeds to step S821.

The camera compatible with dual lenses is a camera to which the dual lenses can be attached, for example.

In step S803, the control unit 501 determines whether firmware of the camera connected in step S801 is compatible with dual lenses. For example, the control unit 501 acquires information regarding a version of firmware of the connected camera from the camera, and determines whether the version of the firmware of the connected camera is a version compatible with dual lenses, based on the acquired information. In a case where it is determined that the firmware is compatible with dual lenses (YES in step S803), the processing proceeds to step S804. In a case where it is determined that the firmware is incompatible with dual lenses (NO in step S803), the processing proceeds to step S821.

Even if a camera compatible with dual lenses is connected to the PC 500, the connected camera sometimes cannot handle dual lenses due to such a reason that the version of the firmware of the connected camera is old. For this reason, the processing in step S803 is to be performed. In addition, various cameras can be connected to the PC 500, and a camera incompatible with dual lenses irrespective of the version of the firmware is sometimes connected. Thus, the processing in step S802 is to be performed before the processing in step S803.

In step S804, the control unit 501 determines whether dual lenses are attached to the camera connected in step S801. In a case where it is determined that the dual lenses are attached (YES in step S804), the processing proceeds to step S805. In a case where it is determined that the dual lenses are not attached (NO in step S804), the processing proceeds to step S821.

In step S805, the control unit 501 transmits the PC live view start request to the camera connected in step S801.

Figure 11A:
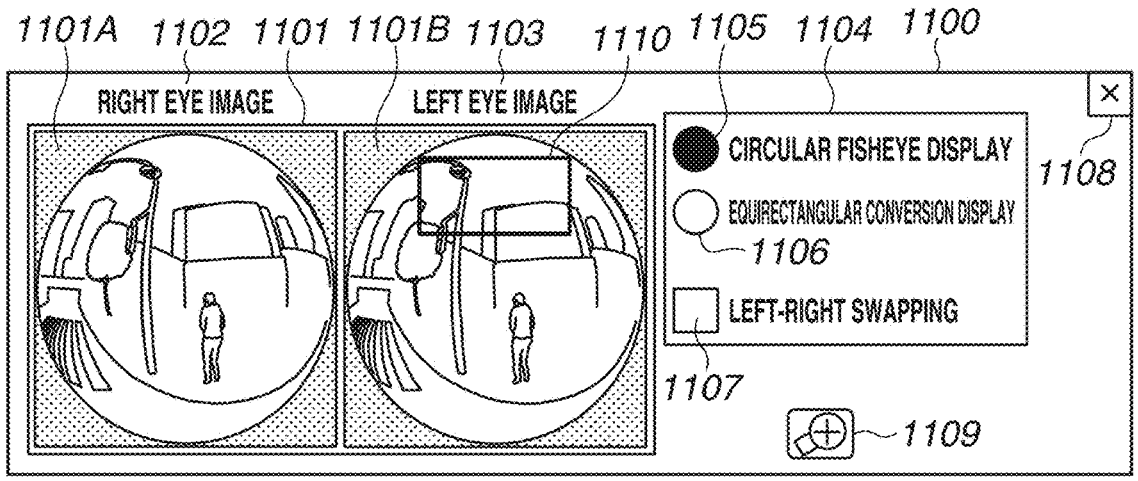
FIGS. 11A, 11B, and 11C are schematic diagrams each illustrating a display example of PC live view.
Figure 11B:
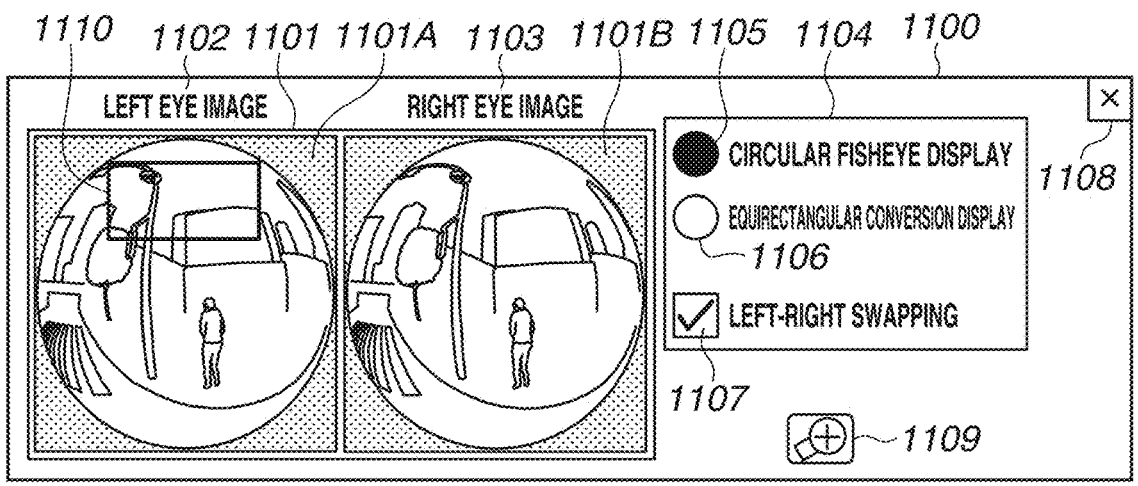
Figure 11C:
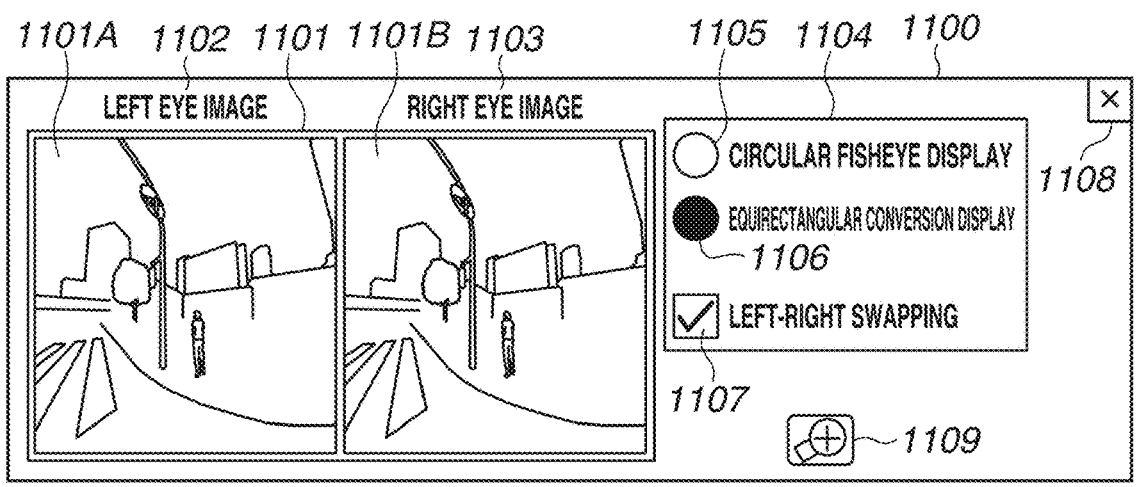

In step S806, the control unit 501 determines whether to perform circular fisheye display. In a case where it is determined that the circular fisheye display is to be performed (YES in step S806), the processing proceeds to step S807. In a case where it is determined that the circular fisheye display is not to be performed (in a case where equirectangular display is to be performed) (NO in step S806), the processing proceeds to step S814. In step S806, the control unit 501 determines whether to perform the circular fisheye display depending on whether a radio button 1105 illustrated in each of FIGS. 11A to 11C is in a selected state or an unselected state, for example. The radio button 1105 is in the selected state in FIGS. 11A and 11B, and the radio button 1105 is in the unselected state in FIG. 11C. In a case where the radio button 1105 is in the selected state, the control unit 501 determines to perform the circular fisheye display, and the processing proceeds to step S807. In a case where the radio button 1105 is in the unselected state, the processing proceeds to step S814.

In step S807, the control unit 501 transmits a live view image request to the camera connected in step S801. In the present exemplary embodiment, the live view image request transmitted in step S807 is a request for a live view image with normal resolution. The normal resolution may be 4K resolution, for example.

In step S808, the control unit 501 receives, from the camera connected in step S801, a live view image captured by the camera and lens information regarding the dual lenses attached to the camera. The resolution of the live view image received in step S808 is the normal resolution. The lens information received in step S808 is information converted to be suitable for the received live view image (for example, the lens information converted in step S608 of FIG. 6).

In step S830, the control unit 501 determines whether the PC live view image acquired from the camera 100 is a whole image or an enlarged image. In a case where the acquired image is an enlarged image (YES in step S830), the processing proceeds to step S831. In step S831, the control unit 501 executes display processing of an enlarged image. The details of the processing in step S831 will be described below.

In a case where the PC live view image acquired from the camera 100 is a whole image (NO in step S830), the processing proceeds to step S809.

In step S809, the control unit 501 determines whether to execute the left-right swapping. In a case where it is determined that the left-right swapping is to be executed (YES in step S809), the processing proceeds to step S810. In a case where it is determined that the left-right swapping is not to be executed (NO in step S809), the processing proceeds to step S812. In step S809, the control unit 501 determines whether to execute the left-right swapping based on whether a checkbox 1107 illustrated in FIGS. 11A, and 11B is ticked, for example. In a case where the checkbox 1107 is ticked, the control unit 501 determines to perform the left-right swapping, and the processing proceeds to step S810. In a case where the checkbox 1107 is not ticked, the processing proceeds to step S812.

In step S810, the control unit 501 generates a processed live view image by swapping the positions of a right image and a left image in the live view image acquired in step S808 based on the lens information acquired in step S808 (left-right swapping). The control unit 501 generates the processed image by swapping the positions of the right image and the left image in the live view image based on central coordinates included in the lens information received together with the live view image (the respective optical axis centers of the left eye optical system 301L and the right eye optical system 301R).

The processing of the left-right swapping will be described in detail. The control unit 501 acquires the central coordinates (the respective optical axis centers of the left eye optical system 301L and the right eye optical system 301R) from the lens information acquired from the camera 100 together with the live view image. The control unit 501 generates a processed image by swapping the positions of a right image and a left image in the captured image based on the central coordinates (left-right swapping). For example, the control unit 501 identifies a region of the right image in the captured image based on the central coordinate of the right image, and identifies a region of the left image in the captured image based on the central coordinate of the left image. Then, the control unit 501 swaps the positions of the identified two regions. In the present exemplary embodiment, the right image and the left image are arranged side by side in the left-right direction in the captured image. By the left-right swapping, a left-right positional relationship between the right image and the left image is inverted. To identify the regions of the right image and the left image more accurately, respective radii (diameters or radii) of the right image and the left image may be acquired from information regarding the dual lenses.

Figure 9A:
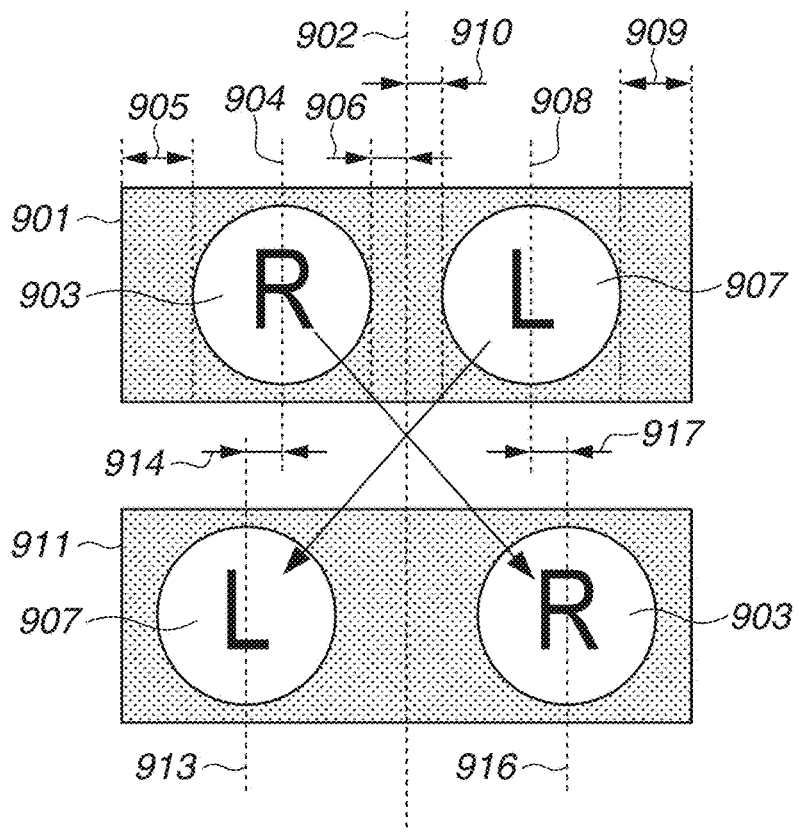
FIGS. 9A and 9B are schematic diagrams of left-right swapping.
Figure 9B:
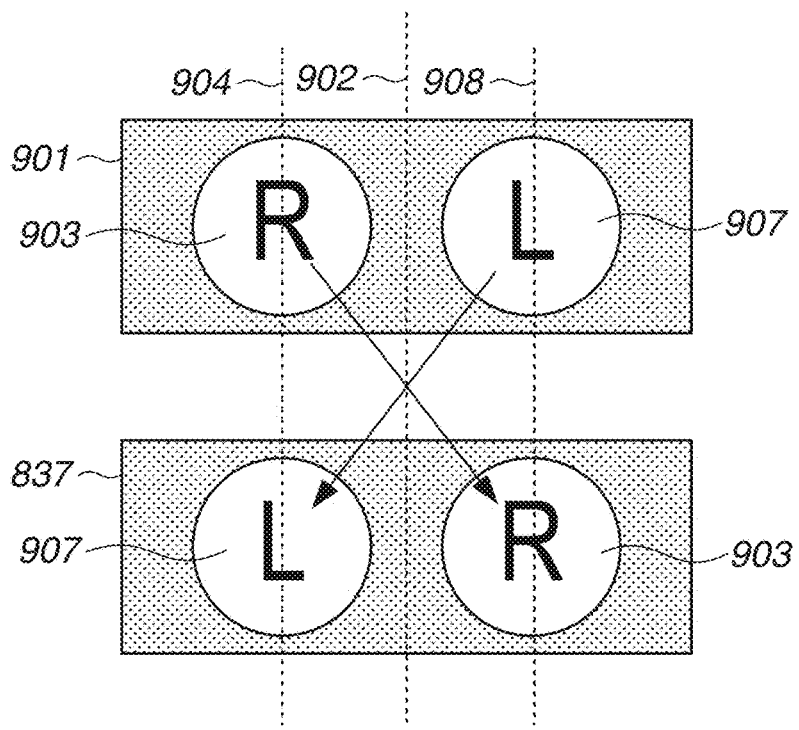

FIGS. 9A and 9B are schematic diagrams of the left-right swapping. FIG. 9A illustrates conventional left-right swapping that does not use information regarding the dual lenses. FIG. 9B illustrates the left-right swapping according to the present exemplary embodiment that uses information regarding the dual lenses.

As illustrated in FIGS. 9A and 9B, in an image 901 not subjected to the left-right swapping, a right image 903 being a circular fisheye image is arranged on the left side, and a left image 907 being a circular fisheye image is arranged on the right side.

In FIG. 9A, the image 901 is divided at a central coordinate 902 of the image 901 into a left-half image and a right-half image, and the positions of the left-half image and the right-half image are swapped. In other words, the left-half image is moved to the right side of the right-half image. An image 911 is an image after such left-right swapping.

In FIG. 9A, the shift amount 906 is smaller than the shift amount 905. In other words, in the image 901, the right image 903 shifts to the center of the image 901 from the center of the left-half image of the image 901. Similarly, the shift amount 910 is smaller than the shift amount 909. In other words, in the image 901, the left image 907 shifts to the center of the image 901 from the center of the right-half image of the image 901. Thus, in the image 911, a central coordinate 913 of the left image 907 in the left-right direction is shifted from a central coordinate 904 by a distance 914, and a central coordinate 916 of the right image 903 in the left-right direction is shifted from a central coordinate 908 by a distance 917. Good stereoscopic view accordingly becomes difficult.

In the present exemplary embodiment, by using lens information, in an image 837 (FIG. 9B) after the left-right swapping, a central coordinate of a left image in the left-right direction can be matched with the central coordinate 904, and a central coordinate of a right image in the left-right direction can be matched with the central coordinate 908. Good stereoscopic view of the image 837 can be consequently obtained.

The method of the left-right swapping is not limited to the above-described method. For example, the shift amounts 905, 906, 909, and 910 in FIG. 9A may be acquired from information regarding the dual lenses, and when the positions of a right image and a left image are swapped, the right image and the left image may be arranged so that the acquired shift amounts are maintained, and remaining regions may be filled with black. The shift amount 905 is a distance from the left end of the captured image to the left end of the right image, and the shift amount 906 is a distance from the center of the captured image to the right end of the right image. In the left-right swapping, the shift amount 905 becomes a distance from the left end of the captured image to the left end of the left image, and the shift amount 906 becomes a distance from the center of the captured image to the right end of the left image. Similarly, the shift amount 909 is a distance from the right end of the captured image to the right end of the left image, and the shift amount 910 is a distance from the center of the captured image to the left end of the left image. In the left-right swapping, the shift amount 909 becomes a distance from the right end of the captured image to the right end of the right image, and the shift amount 910 becomes a distance from the center of the captured image to the left end of the right image.

In step S811, the control unit 501 displays the processed live view image generated in step S810 on the display unit 506.

In step S812, the control unit 501 displays the live view image acquired in step S808 on the display unit 506. In other words, a live view image output from the camera 100 is displayed as-is on the display unit 506.

In step S813, the control unit 501 determines whether to end the PC live view. For example, in a case where connection between the camera 100 and the PC 500 is canceled, or the user issues an end instruction of the PC live view to the camera 100 or the PC 500, the control unit 501 determines to end the PC live view. The end instruction of the PC live view is issued by a press of an end button 1108 illustrated in FIGS. 11A to 11C, for example. In a case where it is determined that the PC live view is to be ended (YES in step S813), the operation illustrated in FIG. 8 is ended. In a case where it is determined that the PC live view is not to be ended (NO in step S813), the processing returns to step S806.

As described above, in a case where the equirectangular display is to be performed (NO in step S806), the processing proceeds to step S814 from step S806. In step S814, the control unit 501 transmits a live view image request to the camera connected in step S801. In the present exemplary embodiment, the live view image request transmitted in step S814 is a request for a live view image with low resolution (resolution lower than the normal resolution). In a case where the equirectangular display is performed, equirectangular conversion (conversion from a circular fisheye image into an equirectangular image) is to be performed. As the resolution of an image to be subjected to the equirectangular conversion becomes higher, a time required for the equirectangular conversion increases, and a delay caused by the equirectangular conversion increases. In the present exemplary embodiment, to speed up the equirectangular conversion (shortening the time required for the equirectangular conversion), a request for a live view image with low resolution is transmitted. If the delay caused by the equirectangular conversion falls within an allowable range, a request for a live view image with the normal resolution may be transmitted also in a case where the equirectangular display is to be performed.

In step S815, the control unit 501 receives, from the camera connected in step S801, a live view image captured by the camera and lens information regarding the dual lenses attached to the camera. The resolution of the live view image received in step S815 is the low resolution. The lens information received in step S815 is information converted to be suitable for the received live view image (for example, the lens information converted in step S608 of FIG. 6).

In step S816, the control unit 501 determines whether to execute the left-right swapping. In a case where it is determined that the left-right swapping is to be executed (YES in step S816), the processing proceeds to step S817. In a case where it is determined that the left-right swapping is not to be executed (NO in step S816), the processing proceeds to step S819. In step S816, the control unit 501 determines whether to execute the left-right swapping based on whether the checkbox 1107 illustrated in FIG. 11C is ticked, for example. In a case where the checkbox 1107 is ticked, the control unit 501 determines to perform the left-right swapping, and the processing proceeds to step S817. In a case where the checkbox 1107 is not ticked, the processing proceeds to step S819.

In step S817, based on the lens information acquired in step S815, the control unit 501 swaps the positions of a right image and a left image in the live view image acquired in step S815, and converts the right image and the left image into equirectangular images. The conversion into an equirectangular image (equirectangular conversion) is conversion processing of converting an image in such a manner that a latitude line (horizontal line) and a longitude line (vertical line) orthogonally intersect with each other while regarding a circular fisheye image as a sphere, as in equidistant cylindrical projection of a map. By the equirectangular conversion, a circular fisheye image having a circular shape is converted into an equirectangular image having a rectangular shape.

The control unit 501 generates a map including pixels of a circular fisheye image and a conversion parameter that are to be used for drawing pixels in an equirectangular image. The map indicates a position in an unconverted image to which each pixel in a converted image corresponds. In the present exemplary embodiment, a map for equirectangular conversion is generated in such a manner that the positions of a right image and a left image can be corrected in addition to enabling a circular fisheye image to be converted into an equirectangular image. In the present exemplary embodiment, a map is generated so that the equirectangular conversion and the left-right swapping can be simultaneously performed. In addition, the control unit 501 may generate a map based on a lens design value corrected using an individual value included in the lens information received together with the live view image.

The control unit 501 generates a processed image by performing the equirectangular conversion using the generated map. The left-right swapping is performed as part of the equirectangular conversion, but the left-right swapping may be performed separately from the equirectangular conversion.

Figure 10:
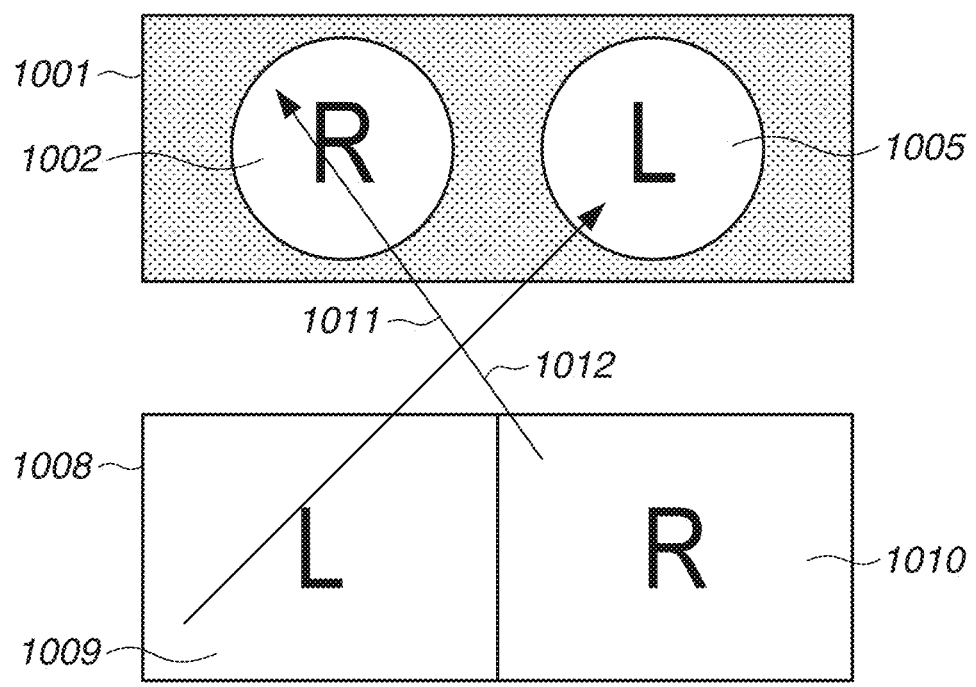
FIG. 10 is a schematic diagram illustrating equirectangular conversion including left-right swapping conversion.

FIG. 10 is a schematic diagram illustrating the equirectangular conversion including left-right swapping conversion according to the present exemplary embodiment. As illustrated in FIG. 10, in an image 1001 not subjected to the equirectangular conversion, a right image 1002 being a circular fisheye image is arranged on the left side, and a left image 1005 being a circular fisheye image is arranged on the right side.

An image 1008 is an image after the equirectangular conversion, and includes equirectangular images 1009 and 1010. In the present exemplary embodiment, a map of the equirectangular conversion is generated so that association as indicated by arrows 1011 and 1012 is performed. In the map of the present exemplary embodiment, pixels in the equirectangular image 1009 arranged on the left side are associated with the respective positions in the left image 1005 arranged on the right side, and pixels in the equirectangular image 1010 arranged on the right side are associated with the respective positions in the right image 1002 arranged on the left side. By using such a map, the left image 1005 arranged on the right side is converted into the equirectangular image 1009 arranged on the left side, and the right image 1002 arranged on the left side is converted into the equirectangular image 1010 arranged on the right side. In other words, in addition to the circular fisheye images being converted into the equirectangular images, the positions of the right image and the left image are swapped. Good stereoscopic view is thereby enabled.

In step S818, the control unit 501 displays the processed live view image generated in step S817 on the display unit 506.

In step S819, the control unit 501 converts the right image and the left image in the live view image acquired in step S815 into equirectangular images without swapping the positions of the right image and the left image. In other words, the control unit 501 generates a processed live view image by performing the equirectangular conversion without performing the left-right swapping.

In step S820, the control unit 501 displays the processed live view image generated in step S819 on the display unit 506.

In a case where a single lens is attached to the camera 100 (NO in step S804), the processing in step S821 is performed. In step S821, the system control unit 50 transmits a live view image captured by a single lens to the display unit 506. Because the processing in step S821 is similar to conventional processing of displaying a live view image captured by a single lens on a PC, a detailed description thereof will be omitted.

In each of steps S810, S817, and S819, the control unit 501 executes image processing on the live view image acquired from the connected camera. In step S813 subsequent to steps S810, S817, and S819, the control unit 501 determines whether to end the PC live view. Then, in a case where the PC live view is to be continued (NO in step S813), the processing returns to step S806 antecedent to steps S810, S817, and S819. Thus, in the operation illustrated in FIG. 8, the image processing in any of steps S810, S817, and S819 may possibly be repeatedly executed.

Thus, to speed up the image processing, the control unit 501 may record information regarding the executed image processing on the RAM 503, and use the information in image processing to be executed next time or later. For example, the control unit 501 records a correspondence relationship between pixels not subjected to the image processing and pixels having been subjected to the image processing (image processing map). The image processing map can continuously be used as long as the resolution of the live view image and the lens information stay the same. When the control unit 501 executes the image processing in any of steps S810, S817, and S819, the control unit 501 records an image processing map of the image processing. Then, when the control unit 501 executes the same image processing again, the control unit 501 executes the image processing using the recorded image processing map. With this configuration, the speed of the image processing can be increased.

FIGS. 11A to 11C are schematic diagrams each illustrating an example of display (display of the PC live view) on an application screen to be displayed by the control unit 501 on the display unit 506. A screen 1100 is an application screen (remote live view screen). The screen 1100 includes a live view display region 1101, a guide display region 1102, a guide display region 1103, an operation region 1104, and the end button 1108.

The live view display region 1101 is a region for displaying the live view image. The live view display region 1101 includes a display region 1101A on the left side and a display region 1101B on the right side. The guide display region 1102 is a region for displaying a character string indicating whether an image displayed in the display region 1101A on the left side is an image of which of the two optical systems (the left eye optical system 301L and the right eye optical system 301R) of the dual lenses. The guide display region 1103 is a region for displaying a character string indicating whether an image displayed in the display region 1101B on the right side is an image of which of the two optical systems (the left eye optical system 301L and the right eye optical system 301R) of the dual lenses. The operation region 1104 is a region for receiving an operation related to the PC live view, and radio buttons 1105 and 1106 and the checkbox 1107 are displayed in the operation region 1104. The radio button 1105 is a radio button to be selected when the circular fisheye display is to be performed, and the radio button 1106 is a radio button to be selected when the equirectangular display is to be performed. In a case where the radio button 1105 is in the selected state, the radio button 1106 enters the unselected state. In a case where the radio button 1105 is in the unselected state, the radio button 1106 enters the selected state. The checkbox 1107 is a checkbox to be ticked when the left-right swapping is to be performed. If the checkbox 1107 is operated, the positions of a right image (right eye image) and a left image (left eye image) of a live view image are swapped, and the character strings displayed in the guide display regions 1102 and 1103 are swapped as well. The end button 1108 is a button for ending the PC live view. An enlarged display button 1109 is a button for issuing an execution instruction of enlarged display processing. A frame 1110 is an item (enlargement frame) indicating a range to be enlarged (enlarged range) in the enlarged display processing, on the live view image. By determining the enlarged range by preliminarily operating the position of the frame 1110, and then executing the enlarged display processing by pressing the enlarged display button 1109, the user can display a desired range in an enlarged state.

In FIG. 11A, the radio button 1105 for performing the circular fisheye display is selected. The checkbox 1107 for performing the left-right swapping is not ticked. Thus, the live view image acquired from a camera is displayed as-is in the live view display region 1101. Specifically, the right eye image being a circular fisheye image is displayed in the display region 1101A on the left side, and the left eye image being a circular fisheye image is displayed in the display region 1101B on the right side.

In FIG. 11B, the radio button 1105 for performing the circular fisheye display is selected, and the checkbox 1107 for performing the left-right swapping is ticked. Thus, the positions of the right eye image and the left eye image in the live view image acquired from a camera are swapped.

Then, a live view image after the left-right swapping is displayed in the live view display region 1101. Specifically, the left eye image being a circular fisheye image is displayed in the display region 1101A on the left side, and the right eye image being a circular fisheye image is displayed in the display region 1101B on the right side.

In FIG. 11C, the radio button 1106 for performing the equirectangular display is selected, and the checkbox 1107 for performing the left-right swapping is ticked. Thus, the positions of the right eye image and the left eye image in the live view image acquired from a camera are swapped, and the right eye image and the left eye image (both being circular fisheye images) are converted into equirectangular images. Then, a live view image after the left-right swapping and the equirectangular conversion is displayed in the live view display region 1101. Specifically, the left eye image being an equirectangular image is displayed in the display region 1101A on the left side, and the right eye image being an equirectangular image is displayed in the display region 1101B on the right side.

In a case where the PC live view image acquired from the camera 100 is an enlarged image, because a live view image obtained by extracting only an enlargement frame portion of a circular fisheye image is transmitted, image information for equirectangular conversion display cannot be obtained. For this reason, in a case where the equirectangular conversion display is to be performed, enlarged display is prohibited by bringing the enlarged display button 1109 into a disabled state. Alternatively, in a case where the enlarged display button 1109 is pressed, display is switched to the enlarged display by forcibly switching the equirectangular conversion display to the circular fisheye display.

<Description on Live View Enlarged Display Control>

In a case where the live view display is performed on the display unit 506 by the PC live view, live view display of an enlarged image can be implemented by transmitting an enlargement instruction of a dual-lens image to the camera 100 from an application of the PC 500. At this time, enlargement processing of the image is executed by the camera 100. The PC 500 receives a live view image to which the enlargement processing has been applied, and displays the live view image on the display unit 506. The PC 500 can issue execution and cancel instructions of the enlargement processing to the camera 100, and set a range (enlarged range) of the dual-lens image to which the camera 100 applies the enlargement processing. The setting of the enlarged range is executed by moving an enlargement frame 810 in response to a user operation on the live view image displayed on the display unit 506, for example. The control unit 501 of the PC 500 notifies the camera 100 of the enlarged range by transmitting information indicating the position of the enlargement frame 810 to the camera 100.

In the PC live view display, as described above, because the left-right arrangement of the left eye image and the right eye image input from the left and right optical systems of the lens unit 300 is inverted in a dual-lens image, the control unit 501 can display the left eye image and the right eye image after swapping their positions.

At this time, a coordinate on a screen at which the enlargement frame 810 is displayed does not match a coordinate of the camera 100. For example, a case is described where the enlargement frame 810 is set on a screen so that the center of the enlargement frame 810 matches the center of the left eye image displayed on the left side. In this case, a central coordinate of the enlargement frame 810 set on the screen corresponds to the approximate center of the right eye image in a coordinate system of the imaging unit 211 of the camera 100. Thus, even if information indicating the position of an enlargement frame in the PC live view is solely transmitted to the camera 100, the camera 100 sometimes fails to be notified of the enlarged range intended by the user.

Figure 12A:
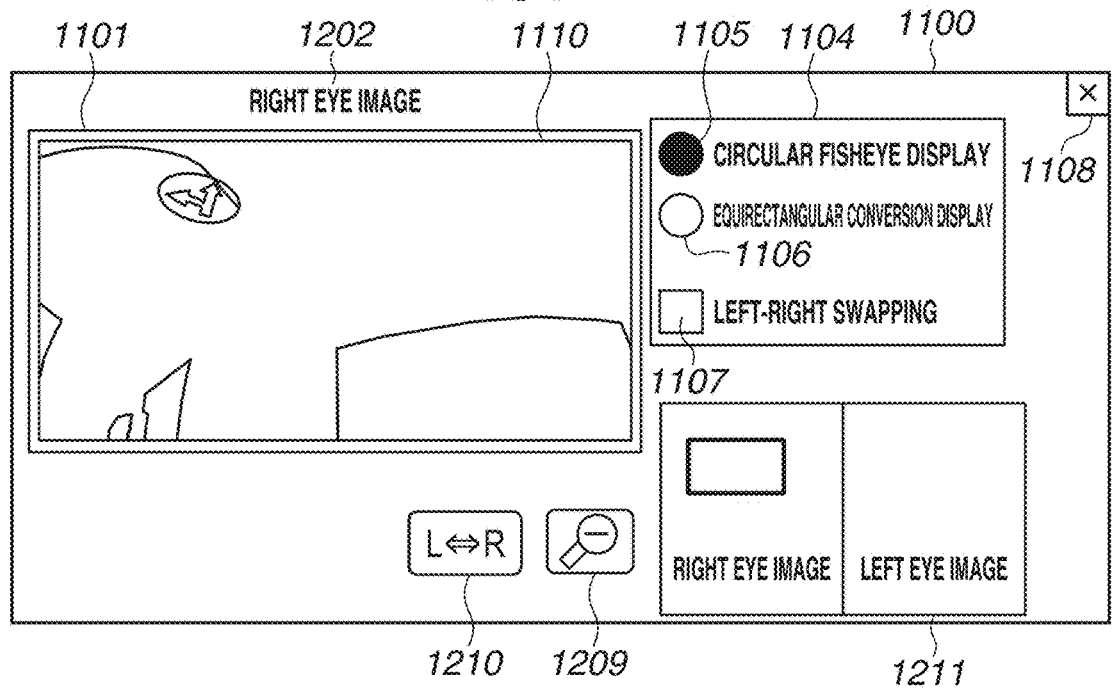
FIGS. 12A, 12B, and 12C are schematic diagrams each illustrating a display example of PC live view to be displayed in a case where an enlarged image is displayed.
Figure 12B:
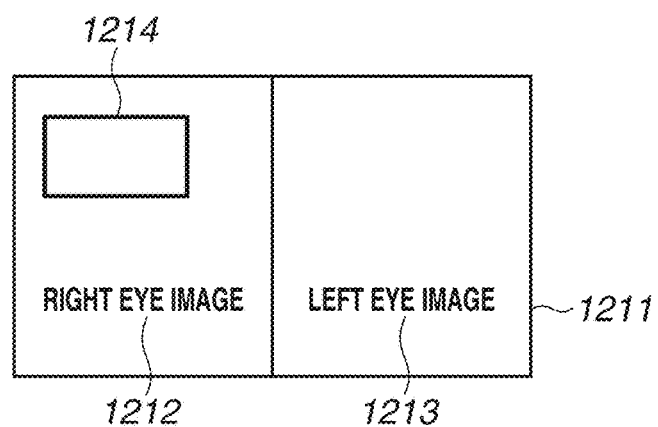
Figure 12C:
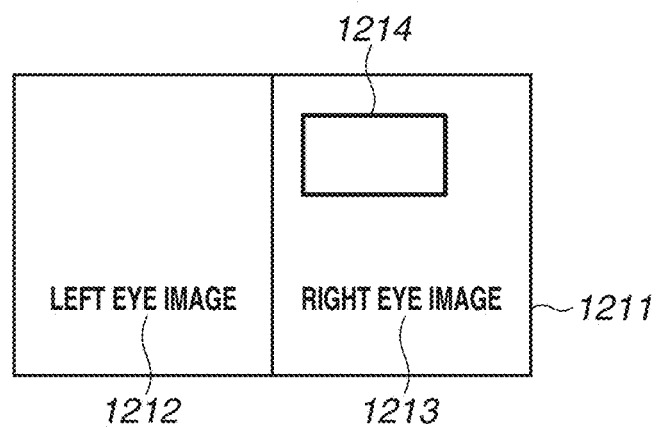

FIGS. 12A, 12B, and 12C are diagrams each illustrating a display example of an application screen to be displayed by the control unit 501 on the display unit 506 during the enlarged display of the PC live view according to the present exemplary embodiment. Regions similar to those in FIGS. 11A, 11B, and 11C are assigned the same reference numerals, and descriptions thereof will be omitted.

An enlarged image to which the camera 100 has applied the enlargement processing of enlarging part of a dual-lens image is output to the PC 500, and the enlarged image is displayed on the display unit 506 of the PC 500. At this time, if the enlarged image is solely displayed on the display unit 506, the user cannot determine a region in the dual-lens image to which the displayed image corresponds. Thus, in a case where the enlarged image is transmitted from the camera 100, the PC 500 acquires information indicating the enlarged range in the dual-lens image (target region of the enlargement processing) from the camera 100, and displays navigation display indicating the enlarged range in the dual-lens image on the display unit 506. The navigation display includes a navigation display region 1211 indicating a region corresponding to the entire dual-lens image, and a frame 1214 indicating the enlarged range in the dual-lens image. The navigation display region 1211 includes a region 1212 indicating a region on the left side and a region 1213 indicating a region on the right side in a case where an image before enlargement is displayed in the PC live view display. By checking the navigation display, the user can recognize a region in the dual-lens image to which the displayed enlarged image corresponds.

FIG. 12A is a diagram illustrating an enlarged display state displayed when the enlarged display button 1109 on an application is pressed in a state in which the live view image illustrated in FIG. 11A is displayed.

A guide display region 1202 is a region for displaying information indicating an image corresponding to a displayed enlarged image, similarly to the guide display region 1102 for the left image and the guide display region 1103 for the right image. In the guide display region 1102, a character string such as "left eye image" or "right eye image" is displayed corresponding to an enlargement target.

A reduced display button 1209 is an operation member for ending enlarged display and shifting to full display.

A left-right switch button 1210 is a button for inputting an instruction to switch an enlargement target from an image currently displayed in an enlarged state to the other image of a left eye image and a right eye image. Upon a press of the left-right switch button 1210, control is performed in such a manner as to switch a target image of enlargement processing from the left image to the right image or from the right image to the left image and set, as an enlarged range, a range corresponding to the enlarged range before switching.

The navigation display region 1211 is a region for displaying a GUI (navigation display) indicating the enlarged range currently displayed in an enlarged state of the entire region of the dual-lens image.

FIG. 12B is an enlarged view of the navigation display. The navigation display includes regions corresponding to a left eye image and a right eye image arranged in a dual-lens image before enlargement. The region 1212 is a region corresponding to the right eye image in the dual-lens image before the enlargement. The region 1213 is a region corresponding to the left eye image in the dual-lens image before the enlargement. An item indicating whether an image displayed in each region corresponds to which of the left eye image and the right eye image is also displayed. In the present exemplary embodiment, the item is a character string such as "left eye image" or "right eye image".

The frame 1214 is display of an enlargement frame indicating a target region (enlarged range) of enlarged display in a dual-lens image. Based on the position of the frame 1214 on the navigation display, the user can recognize whether a region displayed in an enlarged state is a region in a right eye image or a region in a left eye image. The user can also recognize the position of the region displayed in an enlarged state in each image.

Figure 13:
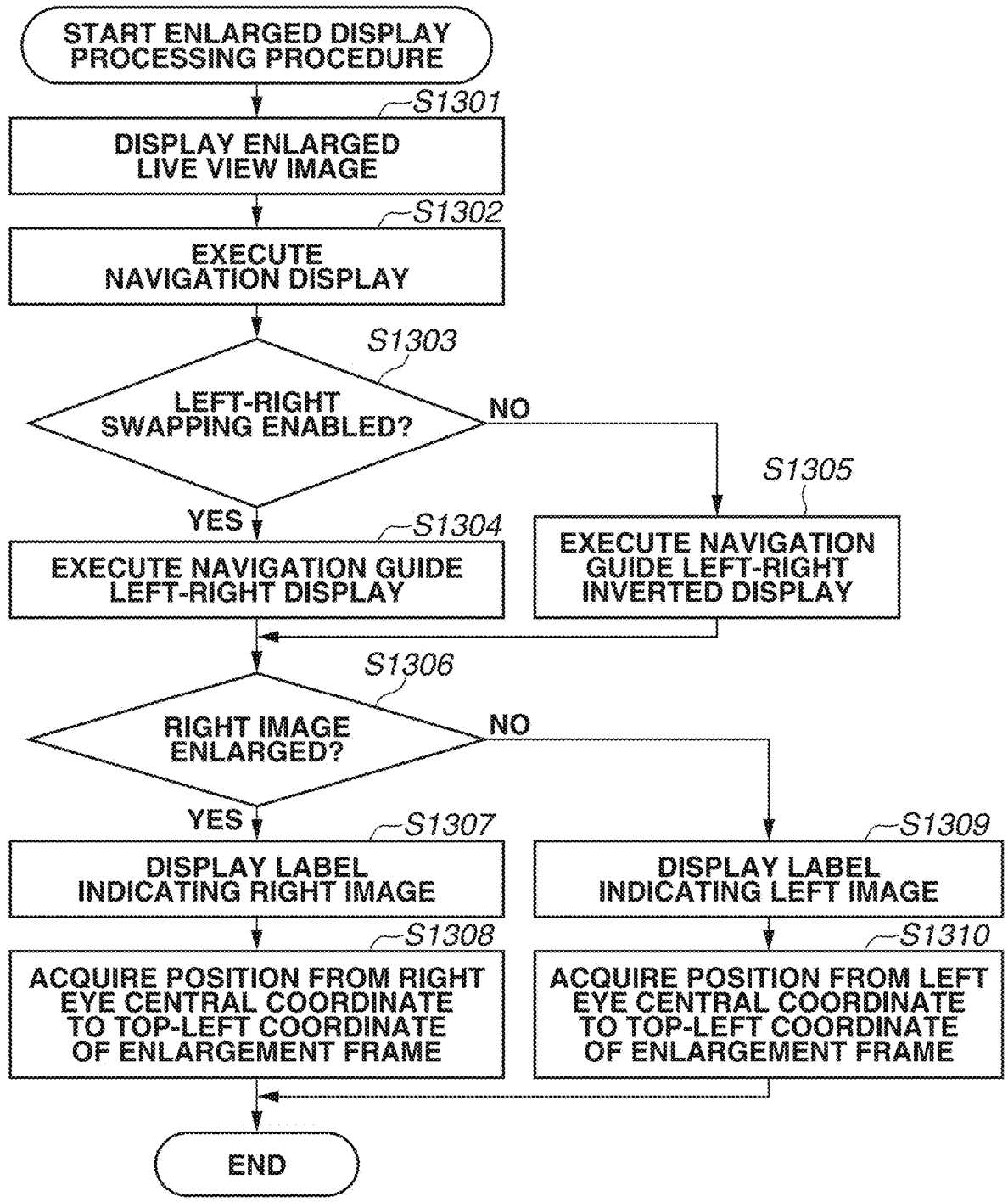
FIG. 13 is a flowchart illustrating display processing of an enlarged image.

FIG. 13 is a flowchart illustrating the display processing of an enlarged image executed in step S831.

In step S1301, the control unit 501 draws an enlarged image acquired from the camera 100 in the live view display region 1101. At this time, the control unit 501 may display the enlarged image after applying enlargement or reduction processing in such a manner that the size of the enlarged image suits the size in a vertical direction or the size in a horizontal direction of the live view display region 1101, or display the enlarged image in the same size centered in the live view display region 1101.

In step S1302, the control unit 501 executes the navigation display indicating a region in a dual-lens image to which the enlarged image corresponds.

In step S1303, the control unit 501 determines whether the left-right swapping is enabled.

The left-right swapping is processing of swapping the positions of a left eye image and a right eye image in an image before enlargement. Whether to enable or disable the left-right swapping is controlled based on the presence or absence of a tick in the checkbox 1107. Then, in a case where the control unit 501 determines that the left-right swapping is enabled (YES in step S1303), the processing proceeds to step 1304. On the other hand, in a case where the control unit 501 determines that the left-right swapping is disabled (NO in step S1303), the processing proceeds to step S1305.

In step S1304, the control unit 501 executes the navigation display corresponding to a left-right swapped dual-lens image. FIG. 12C illustrates the navigation display corresponding to the left-right swapped dual-lens image. At this time, because left and right eyes are in the correct arrangement order, guide display is performed as-is. Nevertheless, because an enlargement position differs from a coordinate position on an image sensor, the display of the enlargement position is changed to a coordinate position obtained after swapping.

In step S1305, the control unit 501 executes the navigation display corresponding to a dual-lens image not subjected to the left-right swapping as illustrated in FIG. 12B. As described above, in a dual-lens image captured using dual lenses, a left eye image and a right eye image are arranged in an inverted arrangement order. Such guide display is displayed in the navigation display region 1211.

At this time, a coordinate position on an image sensor is indicated as the enlargement position.

In step S1306, the control unit 501 determines whether a currently-displayed enlarged image is a right eye image. In a case where the enlarged image is the right eye image (YES in step S1306), the processing proceeds to step S1307. In step S1307, the control unit 501 displays a character string indicating the right eye image in the guide display region 1202. In step S1308, the control unit 501 acquires a position from a center position (central coordinate) of the right eye image to a top-left coordinate of an enlargement frame.

In a case where it is determined in step S1306 that the enlarged image is not the right eye image (NO in step S1306), the processing proceeds to step S1309. In step S1309, the control unit 501 displays a character string indicating the left eye image in the guide display region 1202. In step S1310, the control unit 501 acquires a position from a center position (central coordinate) of the left eye image to a top-left coordinate of the enlargement frame.

<Control of Enlargement Frame Movement Command Issued when Left and Right Eye Images are Swapped>

As described above, in a case where an enlarged image is displayed in the PC live view display, by the navigation display, the user can be notified of a region of a dual-lens image to which the enlarged image corresponds. The PC 500 of the present exemplary embodiment can further designate, on the live view display, a target region (enlarged range) of the enlargement processing to be executed by the camera 100. The user can determine the position of the enlarged range by moving an enlargement frame indicating the enlarged range that is displayed in the PC live view using an operation member (not illustrated). Even if information indicating the position of the enlargement frame in the PC live view is solely transmitted to the camera 100, such an issue that the camera 100 fails to be notified of an enlarged range intended by the user occurs.

As described above, in the dual-lens image transmitted by the camera 100, a left eye image is arranged on the right side in the dual-lens image and a right eye image is arranged on the left side in the dual-lens image. In the PC live view display, an image obtained by applying the left-right swapping of swapping the left eye image and the right eye image of the dual-lens image acquired from the camera 100 is sometimes displayed. In such a case, the user moves the enlargement frame indicating the enlarged range in the displayed image, but a coordinate system in the displayed image differs from a coordinate system in the camera 100. Specifically, it is assumed that the user designates an enlargement frame to be in a region on the left side in the coordinate system of the displayed image to designate a portion in the left eye image in an image in the PC live view display. On the other hand, in the coordinate system of the dual-lens image processed by the camera 100, the left eye image exists in a region on the right side in the dual-lens image. Thus, if a coordinate indicating the position of the enlargement frame in the coordinate system of the PC live view display is transmitted to the camera 100 as-is, a position different from the position intended by the user is designated in some cases.

In view of such an issue, the control unit 501 converts position information of the enlarged range set on the PC live view display into position information in an image generated by the camera 100 based on a display setting (display mode, display format) of the PC live view, and outputs the converted position information to the camera 100. More specifically, in a case where a target region of processing to be executed by the camera 100 is set on the live view display, the control unit 501 converts the set position of the target region based on a display format of the live view display, and transmits an instruction to the camera 100. With this configuration, in the PC live view display, even if image processing involving the movement of a portion of an image is applied to a captured image (dual-lens image) acquired by the camera 100, processing to be executed by the camera 100 can be applied to a range intended by the user.

As illustrated in FIG. 11B, in a case where a live view image is displayed on the PC 500 after swapping the positions of the left and right eye images, a coordinate system of the live view image displayed on the display unit 506 of the PC 500 and a coordinate system of a live view image on the camera 100 are different. FIG. 14A is a schematic diagram illustrating a coordinate system of the live view image on the camera 100. As illustrated in FIG. 14A, in the coordinate system of the camera 100, display control of live view is performed as a state in which the positions of a left eye image and a right eye image are not swapped.

The coordinate system illustrated in FIG. 14A corresponds to coordinate system information acquired from the camera 100, and the control unit 501 acquires a coordinate plane of live view that corresponds to the size of an image sensor of the camera 100, from the camera 100. A right eye lens coordinate region 1422 in dual lenses that is positioned on the left side on the acquired live view coordinate plane, and a left eye lens coordinate region 1423 in dual lenses that is positioned on the right side on the live view coordinate plane exist.

The control unit 501 receives enlargement frame information indicating the position and the size of the enlargement frame 810, and the respective center positions of left and right fisheye images in lens information (a center 1420 of the right eye lens coordinate region 1422 and a center 1421 of the left eye lens coordinate region 1423), from the camera 100 together with a PC live view image.

In a case where a live view image is displayed in the live view display on the PC 500 with the left-right swapping being enabled, the live view image is displayed on the display unit 506 in a state in which the positions of the left eye image and the right eye image are swapped based on the respective central coordinates of the left eye image and the right eye image as illustrated in FIG. 11B.

FIG. 14B illustrates the arrangement of images displayed on the display unit 506 in a case where the control unit 501 performs the live view display after swapping the positions of the left and right images. As illustrated in FIG. 14B, on a live view coordinate plane of the camera 100, a left eye image is displayed in the left side image display region 1101A centered on the center 1420 of the right eye lens coordinate region 1422. In addition, a right eye image is displayed in the right side image display region 1101B centered on the center 1421 of the left eye lens coordinate region 1423. In other words, a live view image is displayed in a state in which a left-right relationship between the images is inverted in an X-axis direction with respect to the coordinate system of the camera. Furthermore, the enlargement frame 810 is similarly displayed in a state in which the respective center positions of the left and right fisheye images (the center 1420 of the right eye lens coordinate region 1422 and the center 1421 of the left eye lens coordinate region 1423) are swapped.

In a state in which the left-right swapping is enabled in this manner, a movement command of the enlargement frame 810 is issued by the user to the PC 500 as indicated by an arrow illustrated in FIG. 14B. If an instruction to move the enlargement frame 810 to a coordinate corresponding to display of an enlargement frame at a movement destination ordered by the user as illustrated in FIG. 14B is directly transmitted to the camera 100 as in a case where the left-right swapping is disabled, such an issue that the enlargement frame 810 is moved to a position unintended by the user occurs.

In a case where the left-right swapping is enabled and the movement command of the enlargement frame 810 has been received from the user, the control unit 501 issues the movement command of the enlargement frame 810 to the camera 100 after converting a movement destination coordinate position of the enlargement frame 810 into a coordinate position in a live view coordinate system of the camera 100 that is illustrated in FIG. 14C.

In the enlarged region movement control in the live view display that is to be executed by the camera 100 based on a command from the PC 500, the camera 100 may be notified of a top-left coordinate of an enlarged region, or a central coordinate of the enlarged region.

<Movement Processing Procedure Example of Enlargement Frame in PC Live View on PC>

Figure 15:
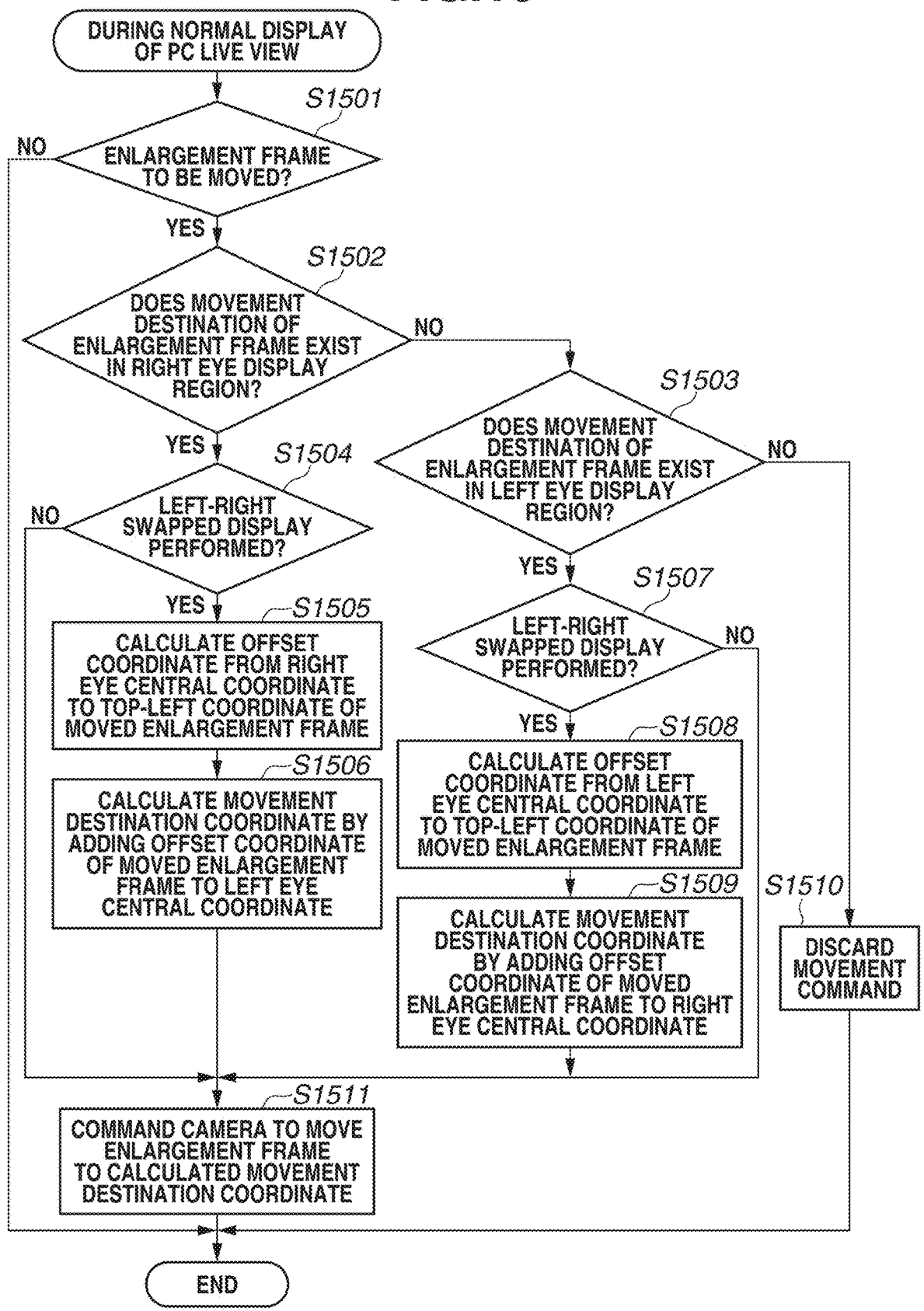
FIG. 15 is a flowchart illustrating enlargement frame movement processing in PC live view display of displaying a non-enlarged image.

FIG. 15 is an explanatory diagram illustrating a flowchart in enlargement frame movement processing in a normal state in which a live view image of the PC 500 is not enlarged.

The processing in the flowchart is started in a state in which a non-enlarged dual-lens image is received and a live view image is displayed on the display unit 506 in live view on the PC 500.

In step S1501, the control unit 501 determines whether an enlargement frame movement command has been issued from the user. In a case where the enlargement frame movement command has been issued (YES in step S1501), the processing proceeds to step S1502. In a case where the enlargement frame movement command has not been issued (NO in step S1501), the procedure of enlargement frame movement control is ended.

In step S1502, the control unit 501 determines whether a movement destination display position of the enlargement frame 810 that is ordered by the user exists in the display region 1101B of the right eye image in left-right swapped display illustrated in FIG. 14B. In a case where the movement destination position of the enlargement frame 810 exists in the display region 1101B of the right eye image (YES in step S1502), the processing proceeds to step S1504. In a case where the movement destination position of the enlargement frame 810 does not exist in the display region 1101B of the right eye image (NO in step S1502), the processing proceeds to step S1503.

In step S1503, the control unit 501 determines whether the movement destination display position of the enlargement frame 810 that is ordered by the user exists in the display region 1101A of the left eye image that is illustrated in FIG. 14B.

In a case where the movement destination position of the enlargement frame 810 exists in the display region 1101A of the left eye image (YES in step S1503), the processing proceeds to step S1507. In a case where the movement destination position of the enlargement frame 810 exists in neither of regions of left and right circular fisheye images (NO in step S1503), the processing proceeds to step S1510.

In step S1504, the control unit 501 determines whether the current live view image display is the left-right swapped display. In a case where the live view image display is the left-right swapped display (YES in step S1504), the processing proceeds to step S1505. In a case where the left-right swapping is not performed (NO in step S1504), the processing proceeds to step S1511. The control unit 501 determines whether an execution instruction of the left-right swapping has been issued based on a selection state of the checkbox 1107 illustrated in FIGS. 11A, 11B, and 11C.

In step S1505, the control unit 501 calculates an offset coordinate from the central coordinate of the right eye lens coordinate region 1422 that is indicated by the center 1420 illustrated in FIG. 14B to the enlargement frame 810 moved by the user, records the offset coordinate on the RAM 503, and advances the processing to step S1506.

In step S1506, the control unit 501 calculates a movement destination coordinate by adding the offset coordinate of the enlargement frame 810 moved by the user that is recorded on the RAM 503, to the central coordinate of the left eye lens coordinate region 1423 that is indicated by the center 1421 illustrated in FIG. 14B, and advances the processing to step S1511.

In step S1507, the control unit 501 determines whether the current live view image display is the left-right swapped display. In a case where the live view image display is the left-right swapped display (YES in step S1507), the processing proceeds to step S1508. In a case where the left-right swapping is not performed (NO in step S1507), the processing proceeds to step S1511.

In step S1508, the control unit 501 calculates an offset coordinate from the central coordinate of the left eye lens coordinate region 1423 that is indicated by the center 1421 illustrated in FIG. 14B to the enlargement frame 810 moved by the user, records the offset coordinate on the RAM 503, and advances the processing to step S1509.

In step S1509, the control unit 501 calculates a movement destination coordinate by adding the offset coordinate of the enlargement frame 810 moved by the user that is recorded on the RAM 503, to the central coordinate of the right eye lens coordinate region 1422 that is indicated by the center 1420 illustrated in FIG. 14B, and advances the processing to step S1511.

In step S1510, the control unit 501 discards the movement command and ends the movement operation.

In step S1511, the control unit 501 commands the camera 100 to move the enlargement frame 810 to the calculated movement destination coordinate of the enlargement frame 810.

Through the above-described procedure, the movement operation of the enlargement frame 810 ends.

<Movement Processing Procedure Example of Enlargement Position in Enlarged PC Live View>

Figure 16:
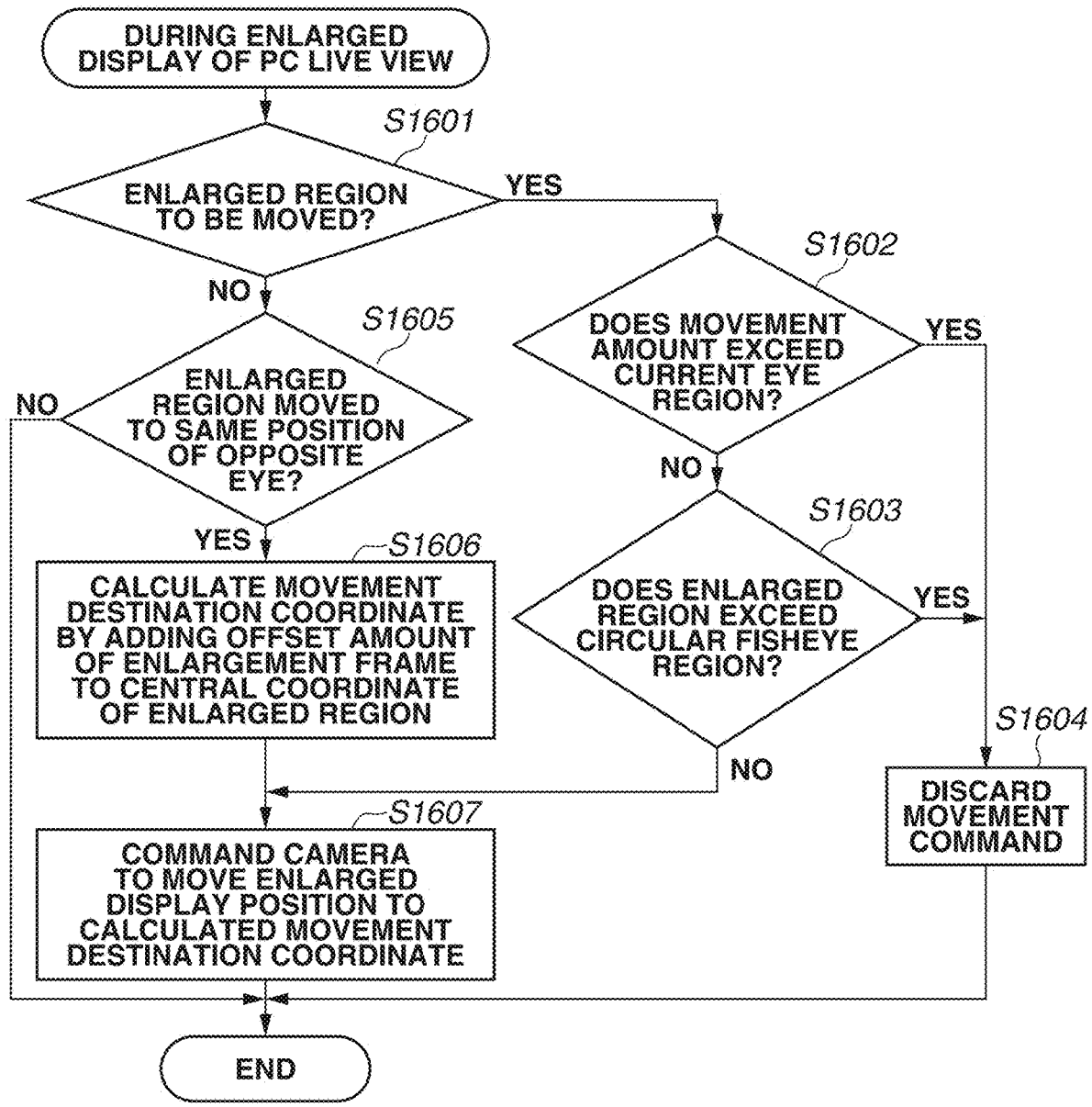
FIG. 16 is a flowchart illustrating enlargement frame movement processing in PC live view display of displaying an enlarged image.

FIG. 16 is a flowchart illustrating control to be executed when a movement command of an enlargement position is received from the user in a case where an enlarged image is displayed as a live view image as illustrated in FIGS. 12A, 12B, and 12C.

The processing in the flowchart is started in a state in which an enlarged live view image received by the PC 500 is displayed on the display unit 506.

In step S1601, the control unit 501 determines whether a movement command of an enlarged region has been issued from the user. In a case where the movement command has been issued (YES in step S1601), the processing proceeds to step S1602. In a case where the movement command has not been issued (NO in step S1601), the processing proceeds to step S1605.

In step S1602, the control unit 501 determines whether an amount of movement of an enlargement frame exceeds a current eye image in a case where the enlargement frame is moved in response to the movement command issued by the user. In a case where the amount of movement of the enlargement frame exceeds the current eye image (YES in step S1602), the processing proceeds to step S1604. In a case where the amount of movement of the enlargement frame does not exceed the current eye image (NO in step S1602), the processing proceeds to step S1603.

In step S1603, the control unit 501 determines whether an enlarged region of the live view thoroughly protrudes to the outside of a currently-displayed circular fisheye region of dual lenses, and the enlarged region is displayed as a black region. In a case where the enlarged region thoroughly protrudes (YES in step S1603), the processing proceeds to step S1604. In a case where the enlarged region does not protrude thoroughly (NO in step S1603), the processing proceeds to step S1607.

In step S1604, the control unit 501 discards the movement command of an enlargement position in the live view display and ends the procedure.

In step S1605, the control unit 501 determines whether the instruction to move the enlarged region to the opposite eye image from the current eye image is input. In a case where the instruction has been input (YES in step S1605), the processing proceeds to step S1606. In a case where the instruction has not been input (NO in step S1605), the procedure is ended.

In step S1606, the control unit 501 calculates a movement destination coordinate by adding an offset amount of the enlargement frame to a central coordinate of the enlarged region in an image to be enlarged, which is a right eye image or a left eye image, and advances the processing to step S1607.

In step S1607, the control unit 501 commands the camera 100 to move the live view enlarged display position to the calculated coordinate of the enlargement position.

Through the above-described procedure, the movement operation of the enlargement position in the enlarged display ends.

The above-described various types of control described as being performed by the system control unit 50 may be performed by one piece of hardware, or the entire apparatus may be controlled by a plurality of pieces of hardware (e.g., a plurality of processors or circuits) sharing the processing. Similarly, the above-described various types of control described as being performed by the control unit 501 may be performed by one piece of hardware, or the entire apparatus may be controlled by a plurality of pieces of hardware (e.g., a plurality of processors or circuits) sharing the processing.

The exemplary embodiments of the disclosure have been described in detail, but the disclosure is not limited to these specific exemplary embodiments, and various configurations without departing from the spirit of the disclosure are also included in the exemplary embodiments of the disclosure. Furthermore, each of the above-described exemplary embodiments merely indicates an exemplary embodiment of the disclosure, and the exemplary embodiments can be appropriately combined.

An application example of the disclosure is not limited to cameras and PCs, and the disclosure can be applied to any electronic device that can handle two images with parallax. For example the disclosure can be applied to a personal digital assistance (PDA), a mobile phone terminal, a portable image viewer, a printing apparatus, a digital photo frame, a music player, a game machine, and an electronic book reader. The disclosure can also be applied to a video player, a display device (including a projection device), a tablet terminal, a smartphone, an artificial intelligence (AI) speaker, a home appliance, and an in-vehicle device.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-091346, filed May 31, 2021, which is hereby incorporated by reference herein in its entirety.

What is claimed is:

1. An information processing apparatus comprising:
a display;
a processor; and
a memory storing a program which, when executed by the processor, causes the information processing apparatus to:
perform communication to communicate with an imaging apparatus being capable of attaching a lens unit and configured to capture one third image including a first image region corresponding to a first image input via a first optical system, and a second image region corresponding to a second image input via a second optical system having predetermined parallax with respect to the first optical system;
perform acquisition to acquire the third image from the imaging apparatus;

perform generation to generate a fourth image from the third image by swapping the first image region and the second image region in the third image;

perform control to display the fourth image on the display;

perform setting to set a position of a target region in the fourth image displayed on the display to which predetermined image processing is to be applied by the imaging apparatus, wherein, in the setting, in a case where the position of the target region set in the fourth image displayed on the display by the control is in the first image region, the position of the target region in the first image region in the fourth image is converted into a position of the target region in the first image region in the third image, and wherein the converted position of the target region is output to the imaging apparatus in the communication.

2. The information processing apparatus according to claim 1, wherein, in the setting, a coordinate of the target region which is designated in the fourth image displayed on the display is converted into a coordinate of the target region in the third image.

3. The information processing apparatus according to claim 1, wherein, in a case where an image obtained by applying the predetermined image processing to the third image is being displayed, on the display, the control is performed to displays a display for indicating the position of the target region in the fourth image on the display.

4. The information processing apparatus according to claim 1, wherein the predetermined image processing is enlargement processing of enlarging a part of the fourth image.

5. The information processing apparatus according to claim 4, wherein, in a case where the fourth image to which the enlargement processing has been applied is being displayed, the control is perform to displays information indicating whether the displayed image is a portion corresponding to the first image or a portion corresponding to the second image.

6. The information processing apparatus according to claim 1,
wherein the program further causes the information processing apparatus to perform information acquisition to acquire lens information indicating a first coordinate corresponding to an optical axis center of the first optical system and a second coordinate corresponding to an optical axis center of the second optical system in the third image, and
wherein the position of the target region is converted based on the position of the target region with respect to a coordinate corresponding to the first coordinate or the second coordinate in the fourth image displayed on the display.

7. The information processing apparatus according to claim 1,
wherein the program further causes the information processing apparatus to perform second acquisition to acquire information regarding the first optical system and the second optical system, and
wherein, in the control, the fourth image obtained by executing image processing of correcting positions of the first image region and the second image region in the third image is displayed on the display, based on the acquired information.

8. The information processing apparatus according to claim 7,
wherein the information includes information regarding an optical axis center of the first optical system in the third image and information regarding an optical axis center of the second optical system in the third image, and
wherein positions of the first image and the second image in the third image are swapped based on the optical axis centers of the first optical system and the second optical system in the third image to generate the fourth image in the generation.

9. The information processing apparatus according to claim 7,
wherein the information regarding the first optical system and the second optical system includes a design parameter of a lens unit including the first optical system and the second optical system, and a parameter unique to the lens unit, and
wherein the fourth image is generated based on the design parameter and the unique parameter in the generation.

10. The information processing apparatus according to claim 7,
wherein the third image is an image in which the first image and the second image are arranged side by side in a left-right direction, and
wherein a left-right positional relationship between the first image and the second image in the third image is inverted in the generation.

11. The information processing apparatus according to claim 1
wherein the first optical system and the second optical system each include a fisheye lens, and
wherein the first image and the second image are circular fisheye images.

12. A control method of an information processing apparatus, the control method comprising:
communicating with an imaging apparatus being capable of attaching a lens unit and configured to capture one third image including a first image region corresponding to a first image input via a first optical system, and a second image region corresponding to a second image input via a second optical system having predetermined parallax with respect to the first optical system;
acquiring the third image from the imaging apparatus;
generating a fourth image from the third image by swapping the first image region and the second image region in the third image;
displaying the fourth image on a display; and
setting a position of a target region in the fourth image displayed on the display to which predetermined image processing is to be applied by the imaging apparatus,
wherein, in the setting, in a case where the position of the target region set in the fourth image displayed on the display by the control is in the first image region, the position of the target region in the first image region in the fourth image is converted into a position of the target region in the first image region in the third image, and
wherein the converted position of the target region is output to the imaging apparatus in the communicating.

13. The control method according to claim 12,
wherein the setting converts a coordinate of the target region which is designated in the fourth image displayed on the display is converted into a coordinate of the target region in the third image in the setting.

14. The control method according to claim 12, wherein, in a case where an image obtained by applying the predetermined image processing to the third image is being displayed on the display, the control is performed to display a display for indicating the position of the target region in the fourth image, on the display.

15. A system comprising:
an imaging apparatus capable of attaching and detaching a lens unit having a first lens unit including a first optical system and a second optical system having predetermined parallax with respect to the first optical system; and
an information processing apparatus,
wherein the imaging apparatus includes:
a processor; and
a memory storing a program which, when executed by the processor, causes the imaging apparatus to:
perform imaging to capture one third image including a first image region corresponding to a first image input via the first optical system and a second image region corresponding to a second image input via the second optical system in a case where the imaging apparatus has the first lens unit being attached; and
perform control to execute predetermined imaging processing based on the third image,
perform transmission to transmit the third image captured in the imaging to the information processing apparatus;
wherein the information processing apparatus includes:
a display;
a processor; and
a memory storing a program which, when executed by the processor, causes the information processing apparatus to:
perform communication to communicate with the imaging apparatus;
perform acquisition to acquire the third image from the imaging apparatus;
perform generation to generate a fourth image from the third image by swapping the first image region and the second image region in the third image;
perform control to display the fourth image on the display; and
perform setting to set a position of a target region in the fourth image displayed on the display to which the predetermined image processing is to be applied by the imaging apparatus,
wherein, in the setting, in a case where the position of the target region set in the fourth image displayed on the display by the control is in the first image region, the position of the target region in the first image region in the fourth image is converted into a position of the target region in the first image region in the third image, and
wherein the converted position of the target region is output to the imaging apparatus in the communication.

16. The system according to claim 15, wherein the setting unit converts a coordinate of the target region which is designated in the fourth image displayed on the display is converted into a coordinate of the target region in the third image in the setting.

17. The system according to claim 15, wherein, in a case where an image obtained by applying the predetermined image processing to the third image is being displayed, on the display, the control is performed to display a display for indicating the position of the target region in the fourth image on the display.

18. The information processing apparatus according to claim 15, wherein the predetermined image processing is enlargement processing of enlarging a part of the fourth image.

19. The system according to claim 15,
wherein the program further causes the information processing apparatus to perform information acquisition to acquire lens information indicating a first coordinate corresponding to an optical axis center of the first optical system and a second coordinate corresponding to an optical axis center of the second optical system in the third image, and
wherein the position of the target region is converted based on the position of the target region with respect to a coordinate corresponding to the first coordinate or the second coordinate in the fourth image displayed on the display.

20. The system according to claim 15, wherein the program further causes the information processing apparatus to perform second acquisition to acquire information regarding the first optical system and the second optical system, and
wherein, in the control, an image obtained by executing image processing of correcting positions of the first image region and the second image region in the third image is displayed on the display, based on the acquired information.

* * * * *